United States Patent

Osofsky et al.

[11] 4,152,766
[45] May 1, 1979

[54] VARIABLE RESOLUTION FOR REAL-TIME SIMULATION OF A POLYGON FACE OBJECT SYSTEM

[75] Inventors: Raymond C. Osofsky, San Jose; David R. Marsh, Los Altos, both of Calif.

[73] Assignee: The Singer Company, Binghamton, N.Y.

[21] Appl. No.: 875,963

[22] Filed: Feb. 8, 1978

[51] Int. Cl.² .................. G06F 15/20; G09B 9/08; H04N 7/18
[52] U.S. Cl. .................. 364/515; 35/10.2; 358/103; 358/104; 364/522
[58] Field of Search ............... 364/515, 522; 358/103, 358/104; 35/10.2

[56] References Cited

U.S. PATENT DOCUMENTS

| | | | |
|---|---|---|---|
| 3,816,726 | 6/1974 | Sutherland et al. | 364/515 |
| 3,996,672 | 12/1976 | Osofsky et al. | 35/10.2 |
| 3,999,308 | 12/1976 | Peters | 35/10.2 X |
| 4,027,403 | 6/1977 | Marsh et al. | 35/10.2 |
| 4,054,917 | 10/1977 | Race | 358/104 |
| 4,077,062 | 2/1978 | Nielsen | 364/521 |

Primary Examiner—Jerry Smith
Attorney, Agent, or Firm—Paul Hentzel; Jeffrey Rothenberg

[57] ABSTRACT

The visual system within an aircraft flight simulator receives flight data from a flight simulation computer, and polygon face terrain data from a gaming area data base. The visual system computer organizes this image data into the prescribed format, and forwards the image data to an image processor. The following types of data are included in the format:

Position vectors (Vp), defining the changing position of the aircraft with respect to the origin of the terrain coordinate system.

Rotational data (H matrix), defining the changing attitude of the aircraft with respect to the terrain coordinate system.

CIF data, defining color, intensity, defocus, etc. of individual faces.

Variable resolution data (Var Res) defining the scan line density (vertical display resolution) for each polygon face is included in the CIF data.

The vertices of each face pass through the image processor as a unit. Each face is displayed on a CRT by a separate miniraster which is caligraphically positioned and which sweepes the electron beam to paint the polygon interior defined by the face vertices. Each face has a uniform color and intensity as determined by the CIF data. Further, each face has a particular vertical resolution determined by the detail and importance of the face, and the time available to present the scan lines.

16 Claims, 16 Drawing Figures

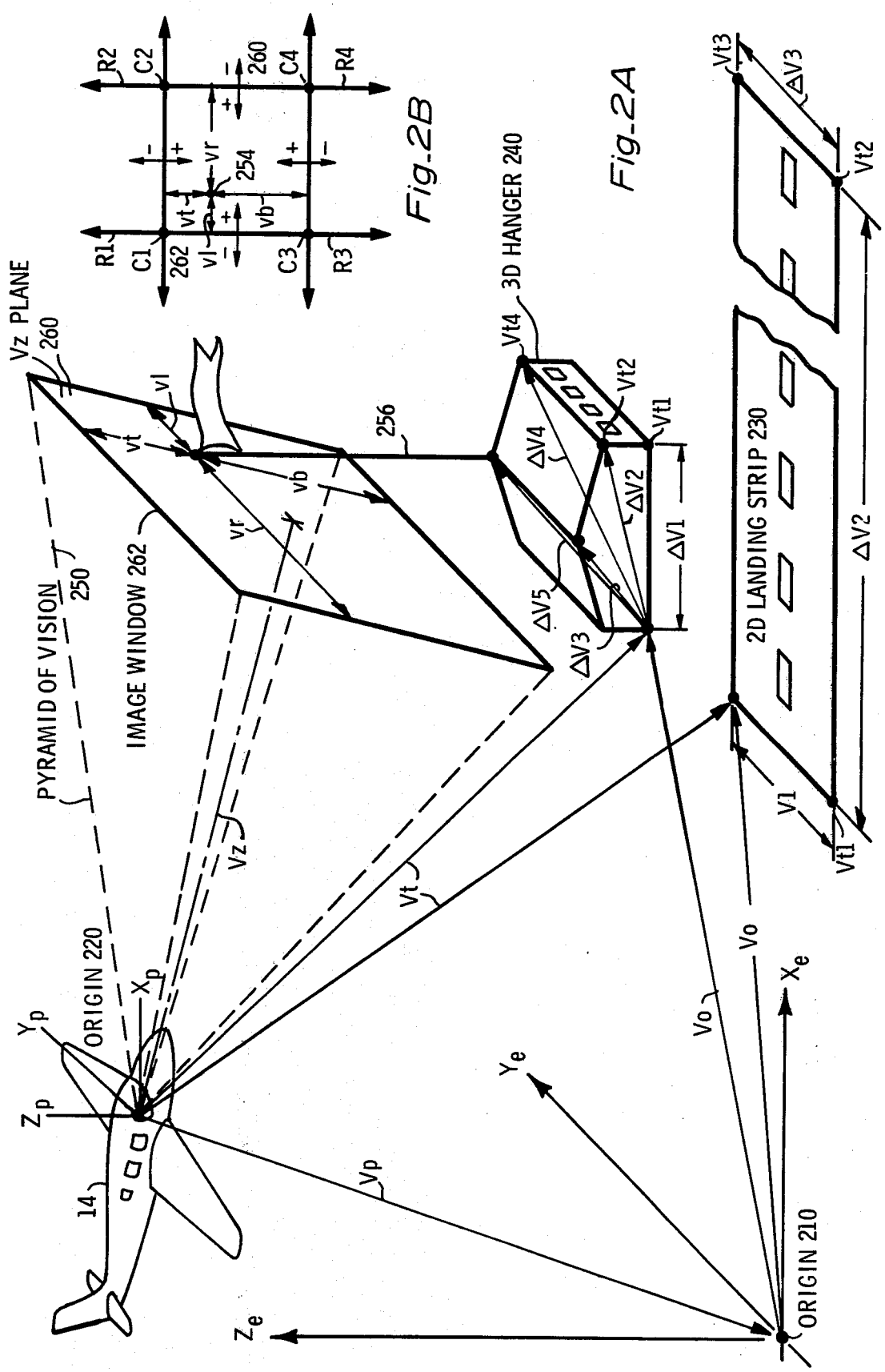

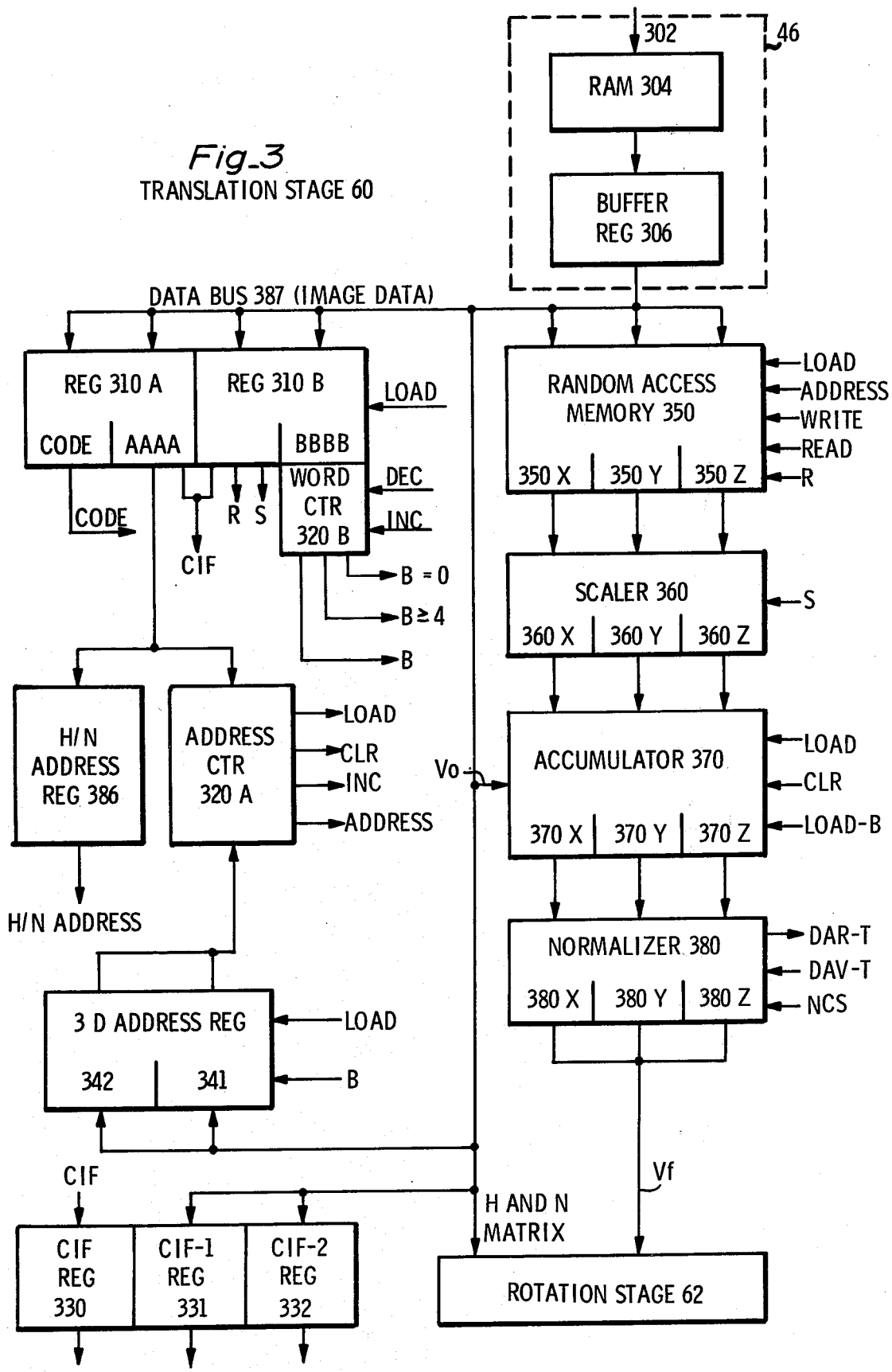
Fig_3
TRANSLATION STAGE 60

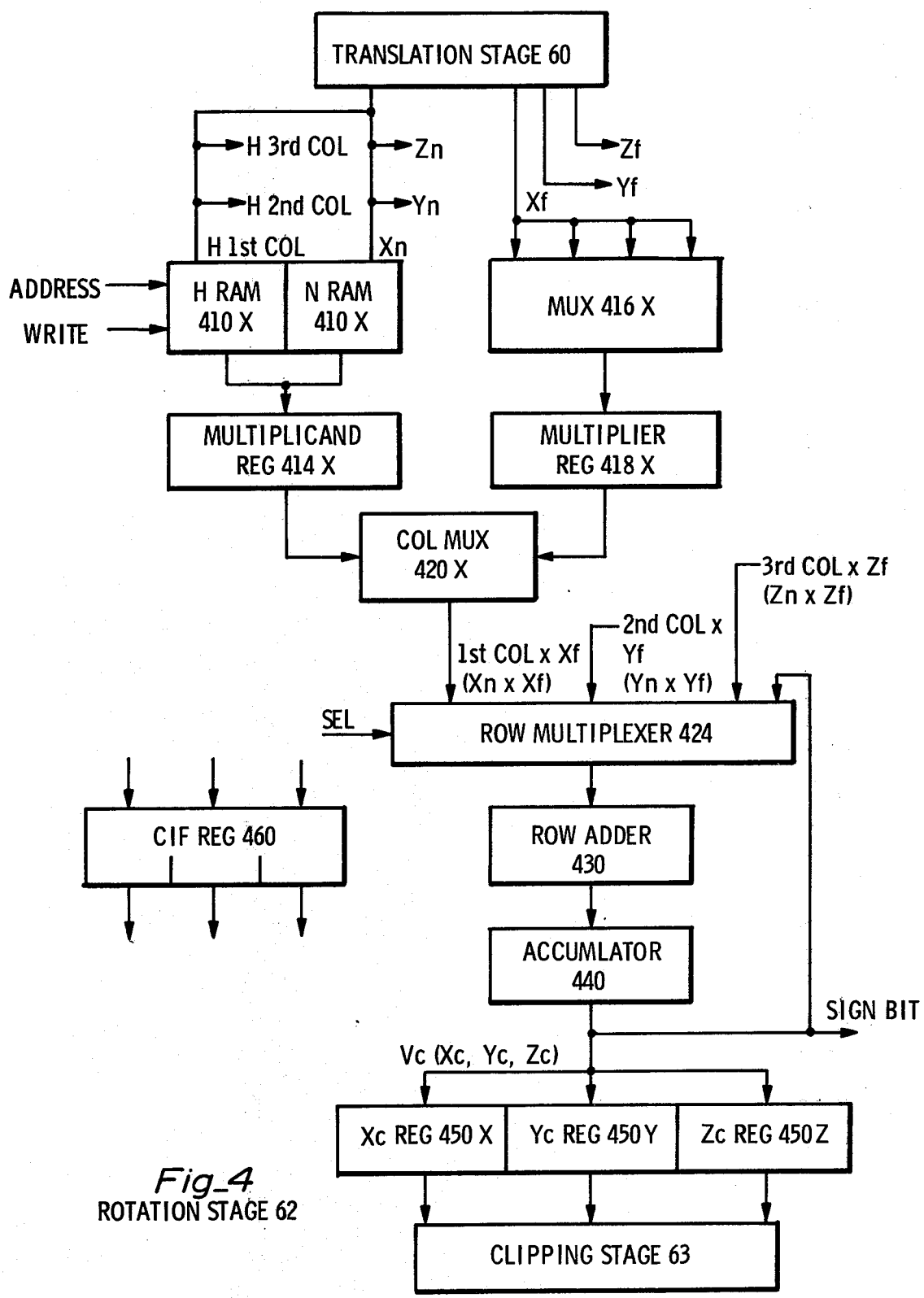

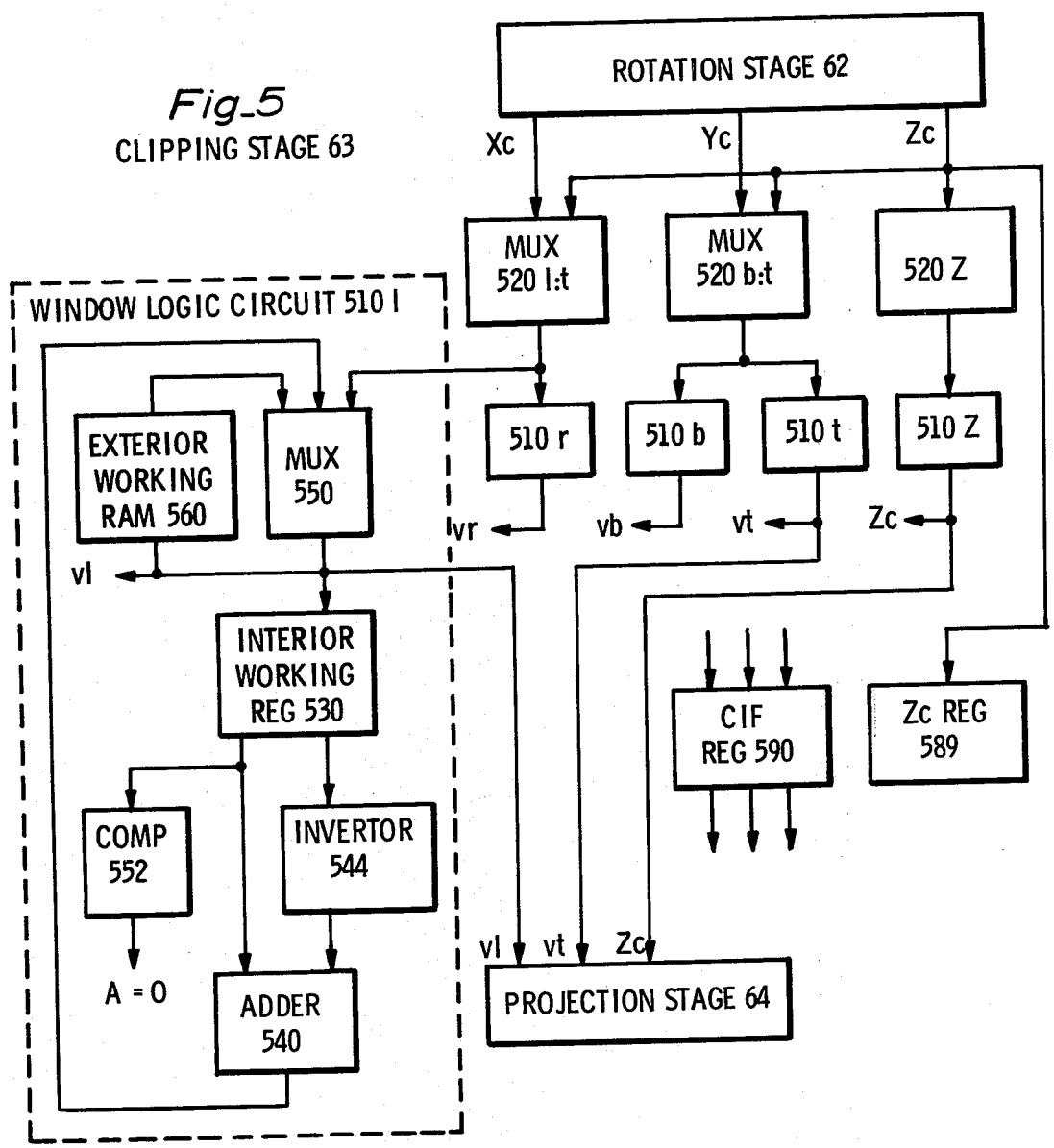
Fig_5
CLIPPING STAGE 63

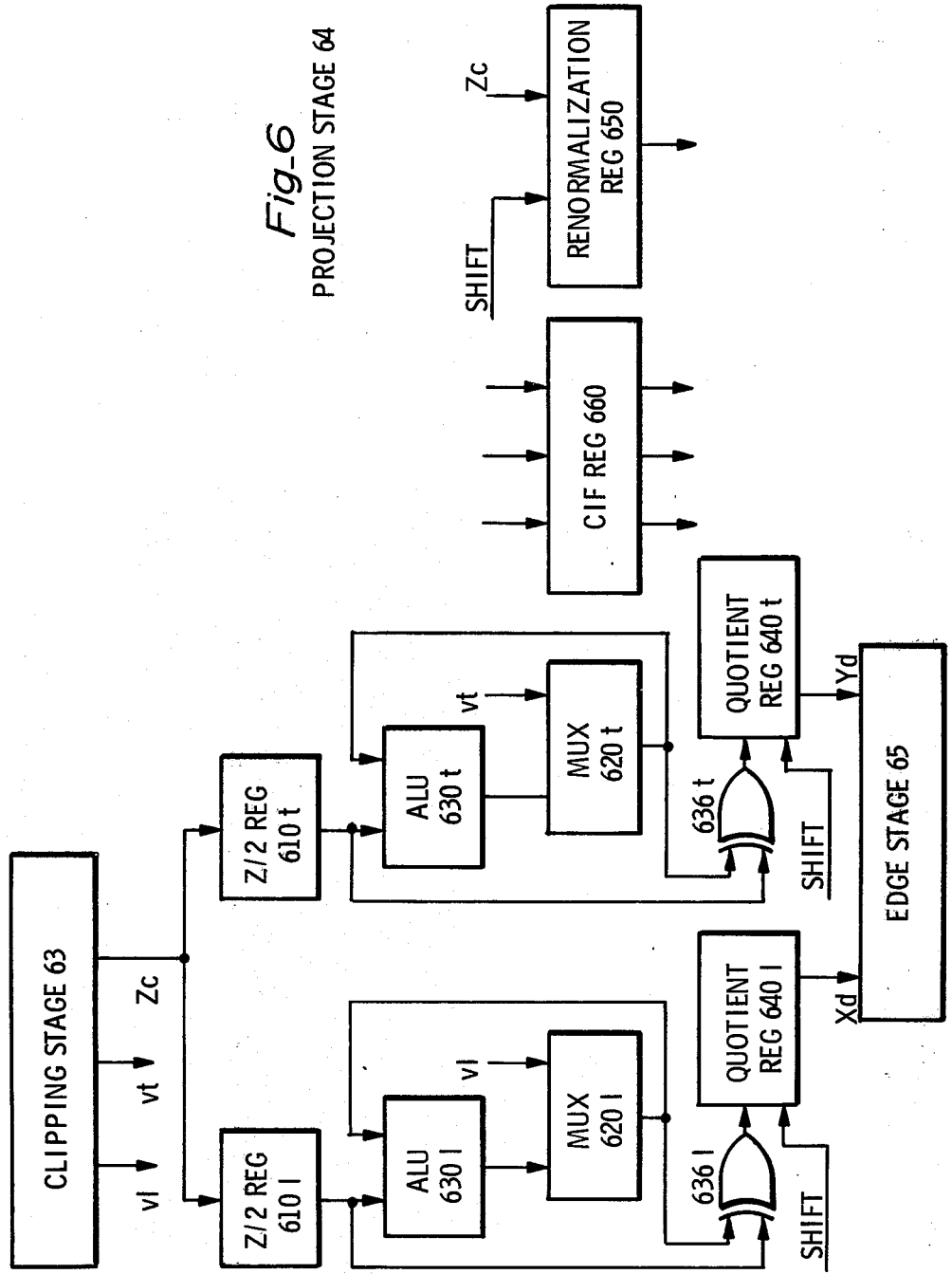
Fig_6
PROJECTION STAGE 64

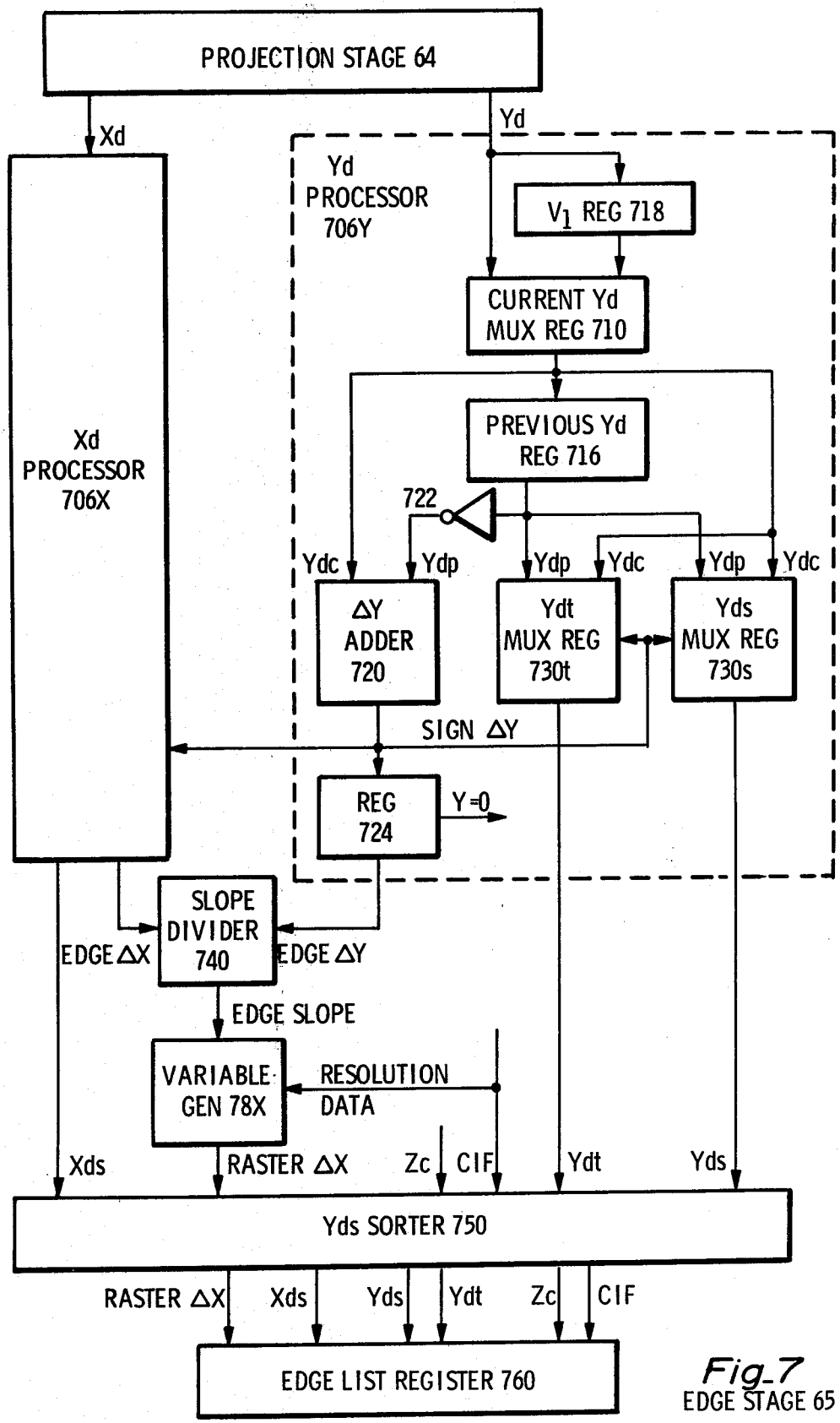
Fig_7
EDGE STAGE 65

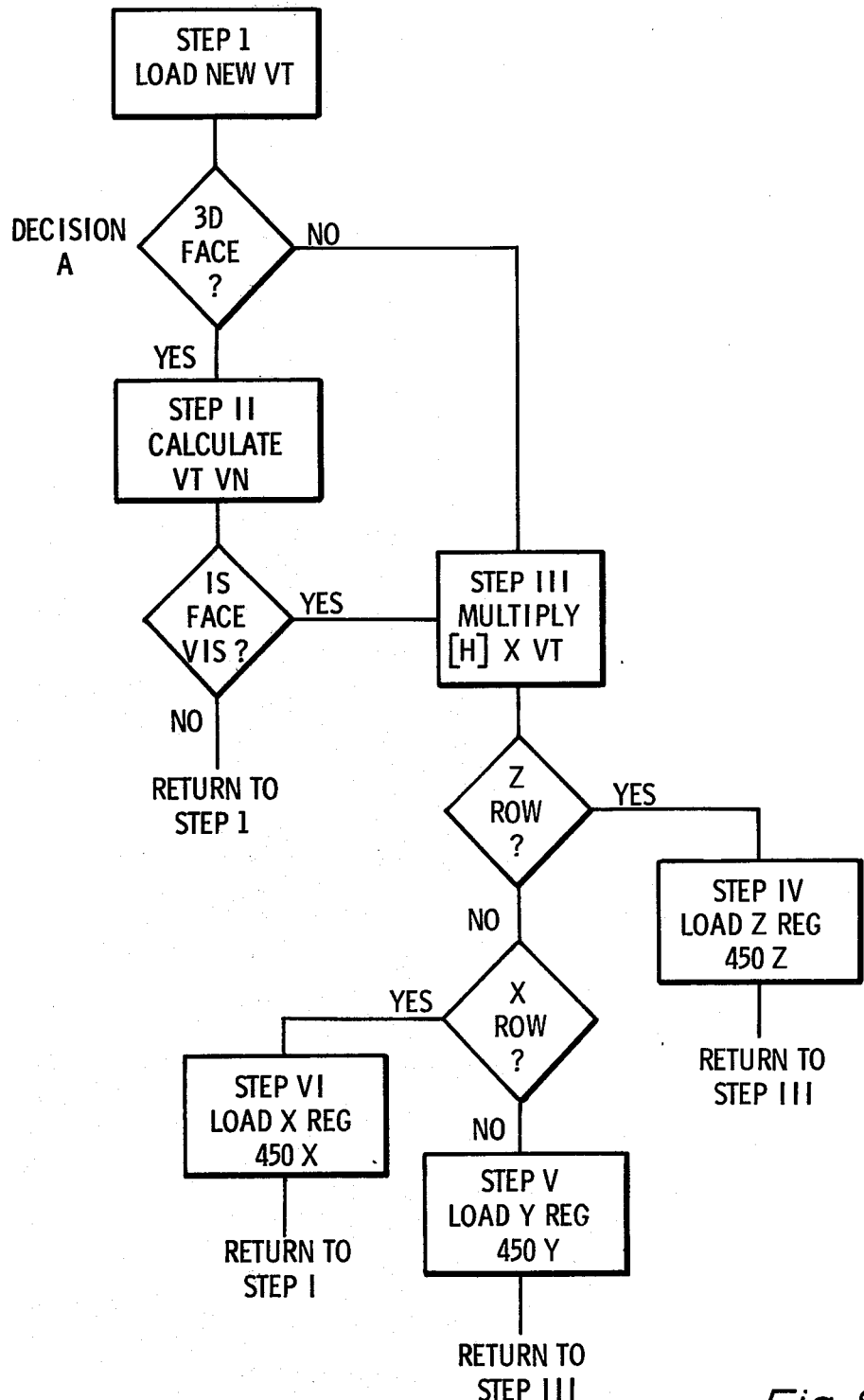
Fig_8A
ROTATION CONTROL

CLIPPING CONTROL

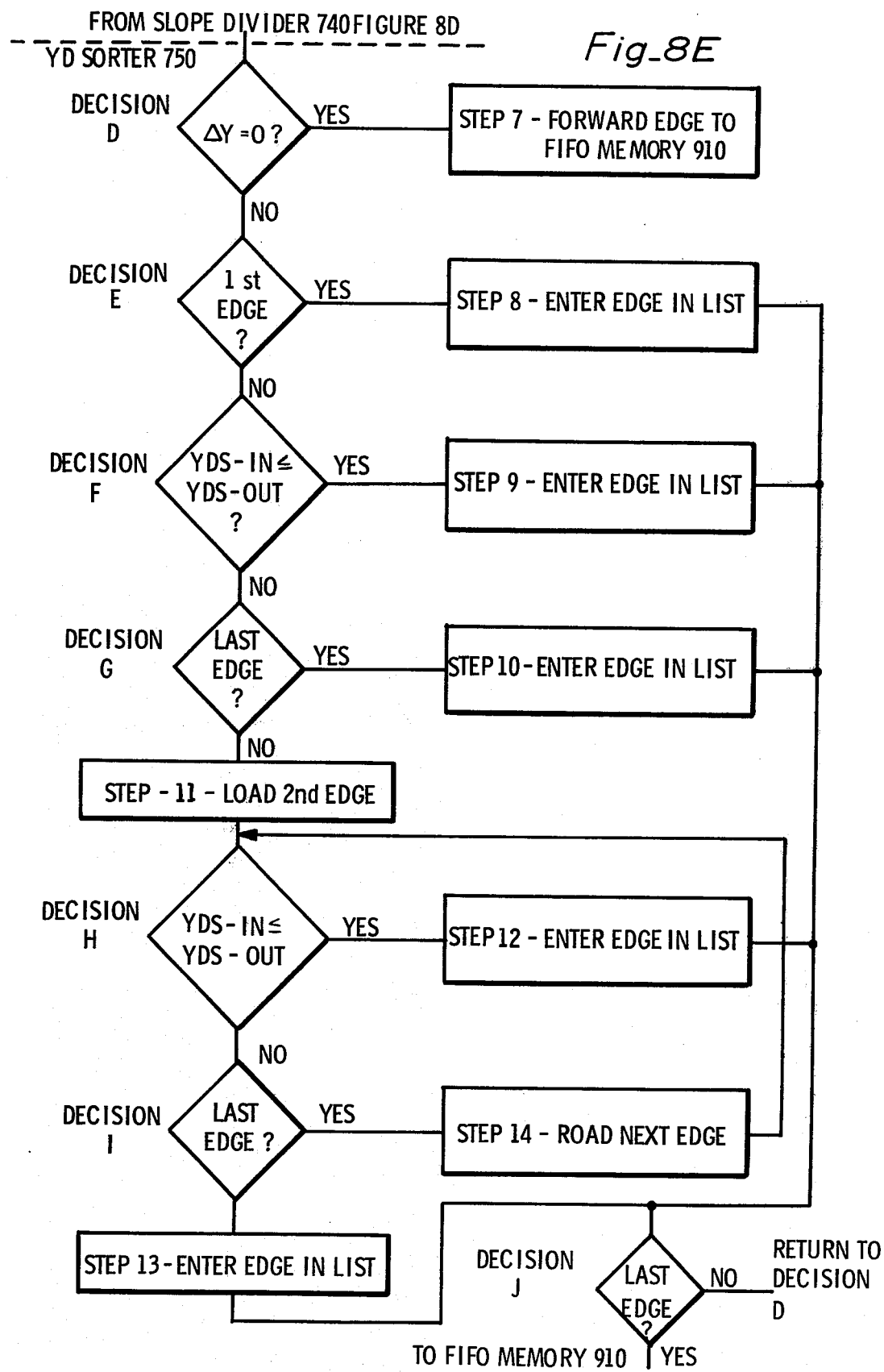
Fig_8E

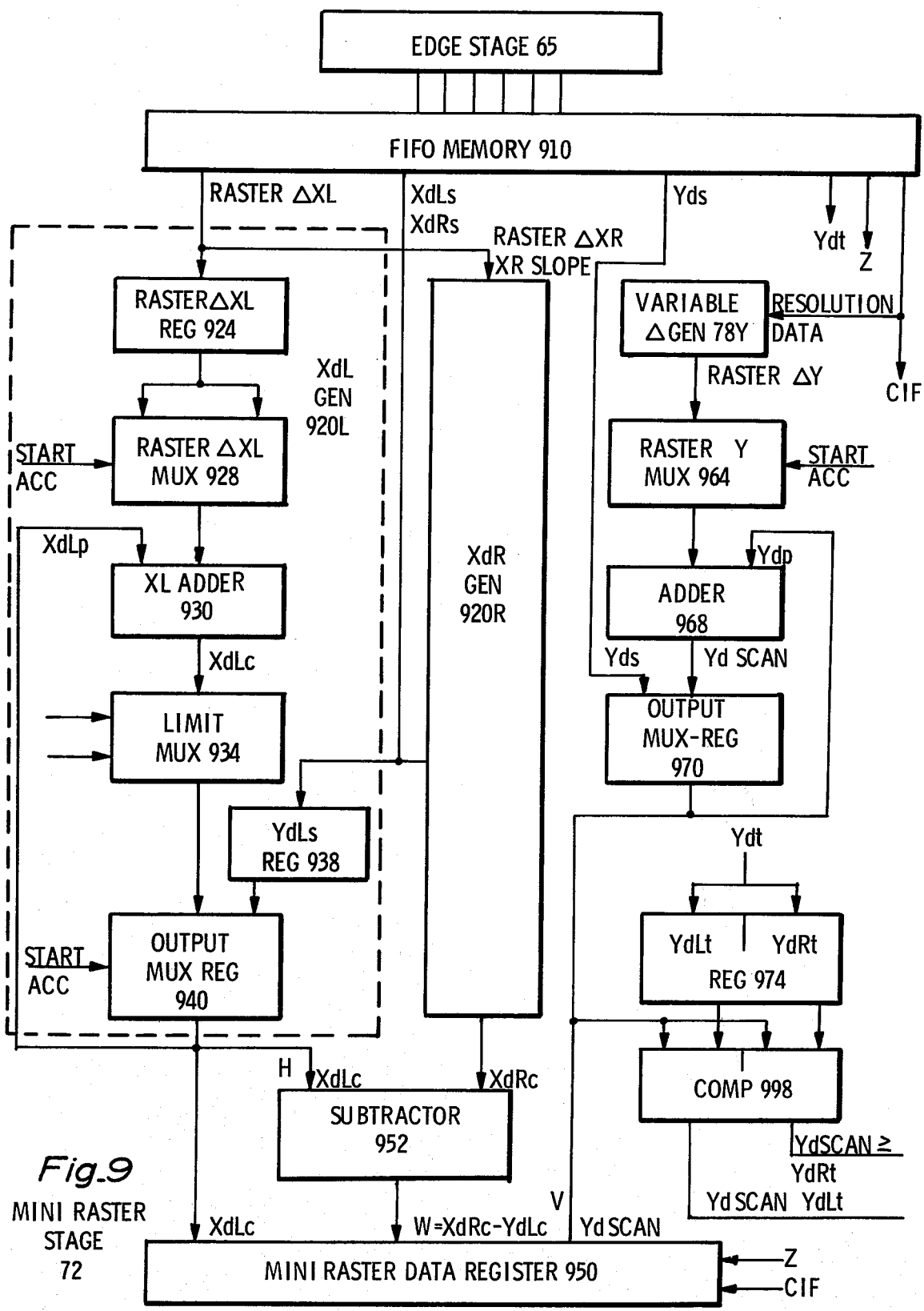

VARIABLE DELTA GENERATOR 78X

VARIABLE RESOLUTION FOR REAL-TIME SIMULATION OF A POLYGON FACE OBJECT SYSTEM

TABLE OF CONTENTS

I—ABSTRACT OF THE DISCLOSURE
II—FIELD OF INVENTION
III—SUMMARY OF THE INVENTION
IV—DESCRIPTION OF THE FIGURES
V—GENERAL DESCRIPTION OF FLIGHT SIMULATION SYSTEM 10
VI—DETAILED DESCRIPTION OF INTERFACE CONTROLLER 46 AND THE DATA FORMAT
VII—DETAILED DESCRIPTION OF DIGITAL VISUAL COMPUTER 12

IMAGE PROCESSOR 42

VIII—TRANSLATION STAGE 60
IX—ROTATION STAGE 62
X—CLIPPING STAGE 63
XI—PROJECTION STAGE 64
XII—EDGE STAGE 65
XIII—CONTROL LOGIC 70
XIV—DISPLAY GENERATOR 44
XV—VARIABLE DELTA GENERATOR 78
  A. RESOLUTION CODE EMBODIMENT
  B. RESOLUTION MODIFICATION EMBODIMENT
  C. DIRECT RESOLUTION DATA EMBODIMENT
  D. DETAILED DESCRIPTION
XVI CONCLUSION
  CLAIMS

SECTION II

FIELD OF INVENTION

This invention relates to real time simulation of a polygon face object system as viewed from a moving observer, and more particularly to such simulation in which the resolution may vary from face to face within the same display frame.

DISCUSSION OF THE PRIOR ART

Heretofore, CRT images have had a single scan line density requiring the entire screen to be displayed at the same resolution. High scan line densities were employed for detailed high resolution requirements, and low scan line densities were employed in fast low resolution applications. However, different resolutions could not be employed simultaneously within the same display frame.

U.S. Patent Application Ser. No. 869,210, entitled "Real-Time Simulation of a Face Object System As Viewed By a Moving Observer," filed Jan. 13, 1978 by the present assignee discloses a flight simulator having a polygon face data base in which face is independently displayed by a separate miniraster created from the vertice coordinates of that face. Sections VI–XI and XIII, and FIGS. 2–6 and 8 of this application are identical to the corresponding Sections and Figures of U.S. Patent Application Ser. No. 869,210.

SECTION III

SUMMARY OF THE INVENTION

It is therefore an object of this invention to provide a simulator visual system with variable resolution capability for simulating a polygon face object system. It is another object of this invention to provide a simulator visual system for rapidly displaying a polygon face object system while selectively maintaining high resolution.

It is a further object of this invention to provide a simulator visual system in which the resolution of each polygon face is selected from a series of predetermined resolution values.

It is yet another object of this invention to provide a simulator visual system in which the resolution of each polygon face varies from frame to frame in response to selected visual parameters.

It is yet a further object of this invention to provide a simulator visual system in which the resolution of each polygon face is a function of the simulated range of that face.

It is still another function of this invention to provide a simulator visual system in which the resolution of each face is a function of the slopes of the edges forming each face.

It is still a further object of this invention to provide a simulator visual system which optimizes the resolution of each face to maximize processing speed without detracting from picture integrity.

SECTION IV

DESCRIPTION OF THE FIGURES

Further objects and advantages of the present invention, and the operation of the variable resolution visual system, will become apparent from the following detailed description taken in conjunction with the drawings, in which:

FIG. 2a is a pictorial representation of an aircraft and several terrain features illustrating the image vectors;

FIG. 2b is a diagram showing outcoding regions;

FIG. 3 is a block diagram of translation stage 60 wherein the delta data is translated into face vertex vectors Vf;

FIG. 4 is a block diagram of rotation stage 62 wherein each Vf is multiplied by an H matrix in response to the aircraft attitude to provide channel vector (Vc=XC+Yc+Zc);

FIG. 5 is a block diagram of clipping stage 63 which eliminates image data outside the field of vision;

FIG. 6 is a block diagram of projection stage 64 wherein Xc and Yc are divided by Zc to project Vc into the X-Y plane to form deflection vector (Vd);

FIG. 7 is a block diagram of edge stage 65 which identifies the edges of each polygon face and the slopes thereof;

FIG. 8 comprising FIGS. 8A–8E is a logic diagram of processor control logic 70;

FIG. 9 is a block diagram of miniraster calculator 72 which provides the starting points and widths of each scan line of the polygon face rasters;

SECTION V

GENERAL DESCRIPTION OF FLIGHT SIMULATION SYSTEM 10

Figure 1:
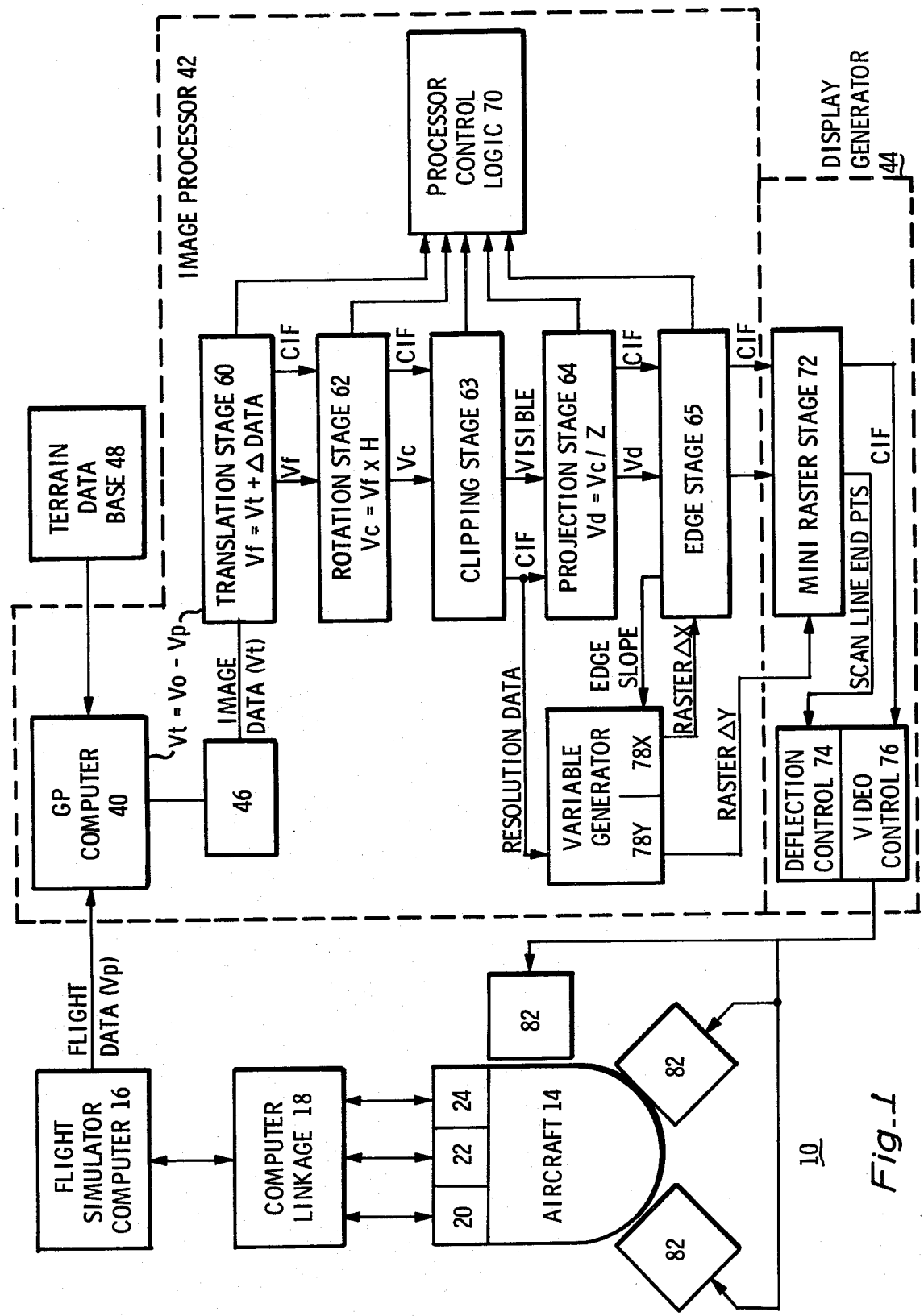
FIG. 1 is a block diagram of visual system 10 and peripheral flight simulation equipment showing data flow relationships.

FIG. 1 shows a flight simulation system 10 with visual capabilities provided by a digital visual system 12. A simulated aircraft 14 is linked to flight simulation computer 16 and visual system 12 through computer linkage 18. Flight computer 16 controls motion system 20 and instrument system 22 of aircraft 14 in response to the pilot's maneuvering action at aircraft controls 24. Visual system 12 is formed by general purpose computer 40 (such as Digital Equipment Corporation PDP 11/35) plus image processor 42, display generator 44, and interface controller 46. Interface controller 46 is provided to process flight data from aircraft 14 to image processor 42 and to control image data flow from GP computer 40 to image processor 42 via a data buffer.

GP computer 40 receives flight data, such as aircraft position Vp, aircraft roll, pitch, and yaw attitude (H matrix), etc. from computer 16. GP computer 40 additionally receives terrain data (both natural formations and cultural structures) from data base 48 such as runways, towers, hangers, roads, rivers, fields, moving objects, etc. In general visual system 12 may process and display terrain features consisting of points, lines, closed convex polygons, or combinations thereof. Preferably the aircraft position data is an aircraft position vector Vp extending from the simulated position of aircraft 14 to the origin of the terrain coordinate system (see FIG. 2). In order to simplify conception and data organization, the terrain origin is preferably located proximate the touchdown area of the runway, and the x axis of the terrain coordinate system from data base 48 is coincident to the runway centerline. An updated Vp is supplied each frame period by flight simulation computer 16 as the flight paramaters of aircraft 14 change. The earth data also includes the position of certain landmark points (Vo) such as the first vertex of each face, and the relative position of the points forming other terrain features (delta data). GP computer 40 subtracts Vp from each Vo to form translated vectors (Vt=Vo−Vp). Translation stage 60 combines the delta with the appropriate Vo to provide the remaining face vertex vector Vf for each face (Vf=Vt+delta data). Rotation stage 62 provides channel vectors Vc to projection stages 64 which project the three-dimensional Vc into two-dimensional display coordinates or vectors Vd. Edge stage 65 provides a list of visible edges defined by the end points and the slope. The data flow through image processor 42 and the mode of operation thereof is controlled by processor control logic 70.

Each polygon face of the image is displayed at the particular scan line density specified by the resolution data. This resolution data may be given in the data base as a word containing the value delta Y (or scan line density) for each face. In one embodiment, the resolution data is a smaller code word which later identifies a particular delta Y value form a set of predetermined delta Y values. Alternatively, the resolution data may be generated on line, in response to each display situation. That is, the resolution of a particular face may vary between frames and need not be fixed by data base. The required scan line spacing (delta Y) for each resolution is generated by variable delta generator 78Y. Miniraster stage 66 calculates the end-points of each raster scan line required to display the face. The changes in X at the endpoints of adjacent scan lines is provided by variable delta generator 78X.

Display generator 44 receives the scan line end points and provides the required analog deflection voltages to CRT display devices 82. Display generator 44 also receives the color, intrinsic intensity and size portion of the data for compensating the CRT beam voltage, current and focus in view of the variable resolution. The CRT in device 82 is preferably a color, beam penetration, random deflection tube which allows precise control of spot position and continuous control of spot focus and diameter.

SECTION VI

DETAILED DESCRIPTION OF INTERFACE CONTROLLER 46 AND THE DATA FORMAT

GP computer 50 has an in-core, buffer memory which accumulates blocks of image data required to form each display frame. The incore buffer contains initialization points (Vo) and delta data from data base 48 plus each new position vector $V_p$ and rotational matrix (H) as they are computed by flight computer 16.

The image data accumulating in the in-core buffer is periodically transferred as a data block to hardware RAM buffer 304 in interface controller 46. Controller 46 processes the data words sequentially to image processor 42 while GP computer 40 simultaneously assembles the next data block in the in-core buffer for the next data handshake with RAM 304. The accumulation of data blocks in GP computer 16 and the handshake data transfer to RAM 304 is outlined in the following four operations:

Operation I—Preflight Load—Data Base 48 to Core Memory

Prior to each training flight, the content of data base 48 is loaded into computer 40 core-memory. Image data from data base 40 includes sixteen control words (00000-1111) having bit formats as described hereinafter, initilization data Vo, delta data, etc.

Operation II—Aircraft Orientation Update

The in-core memory is updated periodically with the most recent aircraft orientation angles roll, pitch and yaw (H matrix data) from flight computer 16. Preferrably, this aircraft update occurs once each frame. The H matrix data is received by computer 40 as the sine and cosine of each of the three orientation angles—six items of data. The software of computer 40 responds to the orientation data to form the rotational matrix H described in the specification (Section IX). The software merely calculates the proper sine-cosine products to form a 3×3 matrix for each angle, and multiplies the three 3×3 matrices together to generate the nine elements of the rotational matrix H. These nine elements are generated each frame and inserted into RAM 304 at the proper place. The nine elements of rotational matrix H preferably occupy the lead position in the core-memory because the rotational perspective must be developed by rotation stage 62 each frame prior to displaying any of the object faces on display 82.

Operation III—Aircraft Position Update

The core-memory update also includes the most recent aircraft position vector Vp which latter forms a series of initialization vectors Vo in translation stage 60.

Operation IV—Handshake Between Core-Memory and RAM 304

As required the contents of the core-memory matrix are serially transferred to RAM 304 in interface controller 46, starting with the nine rotational elements.

The four above described operations involve simple software steps. Operations I, III, and IV are merely data transfer steps. Operation II involves forming a triple 3×3 matrix product, a mathematical operation which is well understood. Subroutines are available to execute this systematic multiplication.

FORMAT SUMMARY

The data format is formed by groups of data words which describe the nature and position of each object feature, and spaced instruction words for identifying the type of data in the immediately subsequent group of data words. The MSB bits of each instruction word are coded to define the particular instruction contained in the word, and the remaining bits concern the subsequent data. In the embodiment shown, a sixteen bit format is employed. The four MSB define the instruction and are decoded by processor control logic 70 to control the flow of data through image processor 42. The four LSB of each instruction word reveal the number of subsequent data words in the data word group to be processed under that instruction word. Each instruction word is loaded into registers 310A and 310B by control logic 70 in due course, and the immediately subsequent group of data words is loaded into RAM 350.

FIVE LOAD INSTRUCTIONS (0-4)

Each load instruction transfers point coordinates from buffer 306 into RAM 350 as follows:

| | 15 12 | 11 8 | 7 6 | 3 0 |
|---|---|---|---|---|
| LDA (4) | 0 1 0 0 | A A A A | R R | B B B B |

Load A instruction causes the subsequent group of B sets of X, Y, Z coordinates to be stored in RAM's 350X, 350Y, and 350Z, beginning at address A. The first coordinate (one of two sixteen bit words) is stored in the RAM 350X, the second in the RAM 350Y, and the third in the RAM 350Z. This sequence is repeated until B sets of coordinates have been loaded starting at address A. R specifies the significance of the bits in the subsequent sixteen bit data words for coordinating the distribution thereof across the 24 bits of RAM's 350.

Normal 24 bit resolution (R=3) requires two subsequent data words. The first word provides the sixteen LSB to RAM's 350 and the second word provides the 8MSB to RAM's 350. Vp and Vo data require the full 24 bits and therefore are preceded by an LDA instruction word with R=3. The LSB of Vp preferably corresponds to ⅜ of an inch to eliminate detectable jitter of the scene from frame to frame. A new Vp is calculated by FS computer 16 each frame, and the round-off error in the LSB of Vp causes the entire earth coordinate system to jump a ground distance equal to the LSB. This interframe displacement (motion resolution) is minimized and rendered indetectable to the pilot trainee by providing aircraft position vector (Vp) resolution at the ⅜ inch level. The LSB of Vo is preferably small in order to accurately position detailed structure within a terrain feature (positional resolution). In the embodiment shown, Vo LSB also equals ⅜ inch because image processor 42 is already required to handle the ⅜ inch bit in order to prevent interframe displacement. That is, the position resolution may have the same value as the motion resolution as in the embodiment shown; but it is not required that the two resolutions be equal. However, a ⅜ inch Vo position resolution permits moving objects such as other airplanes and ground vehicles to be viewed without interframe displacement. The MSB of both Vp and Vo is 262,144 feet forming a cubic gaming volume in data base 48 which is 262,144 feet on an edge.

Fine 16 bit resolution (R=1) requires a single subsequent 16 bit data word of delta data which is entered into the 16LSB of 24 bit RAM's 350 (bits 16-23 are loaded with the sign bit 15). The MSB corresponds to 1024 feet (when LSB=⅜ inch). The fine 16 bit resolution may be used to process the vertices of small terrain faces (largest dimension less than 1024 feet) which is associated with high resolution detailed structure.

Coarse 16 bit resolution (R=2) requires a single 16 bit subsequent data word of delta data which is entered into the 16 MSB of 24 bit RAM's 350 (bits 0-7 are loaded with "0"s). The MSB=262,144 feet and LSB=8 feet. The coarse 16 bit resolution may be used to process the vertices of large terrain faces in which the dimensions have been rounded off to multiples of eight feet. While the size resolution of these faces is eight feet, they are positioned with the same resolution as the associated Vo.

| | 15 12 | 11 8 | 7 6 | 3 0 |
|---|---|---|---|---|
| LXY (3) | 0 0 1 1 | A A A A | R R | B B B B |

Load XY instruction causes the subsequent group of B pairs of X and Y coordinates to be stored in the RAM 350X and RAM 350Y, beginning at address A. "0"s are stored in the corresponding addresses of the RAM 350Z. The data format is one or two 16 bit words of X data followed by one or two words of Y data. This sequence is repeated until B pairs of X-Y coordinates have been loaded into RAM's 350X and 350Y. The R codes are the same as for LDA.

| | 15 12 | 11 8 | 7 6 | 3 0 |
|---|---|---|---|---|
| LDX (0) | 0 0 0 0 | A A A A | R R | B B B B |

Load X instruction causes the subsequent group of B X coordinates to be stored in the XT RAM 350X beginning at address A. Zeros are stored in the corresponding addresses of RAM's 350Y and 350Z.

| | 15 12 | 11 8 | 7 6 | 3 0 |
|---|---|---|---|---|
| LDY (1) | 0 0 0 1 | A3 A2 A1 A0 | R R | B3 B2 B1 B0 |

Load Y instruction is the same as LDX except that the data is stored in RAM 350Y and "0"s are stored in the corresponding addresses in RAM 350X and RAM 350Z.

| | 15 12 | 11 8 | 7 6 | 3 0 |
|---|---|---|---|---|
| LDZ (2) | 0 0 1 0 | A A A A | R R | B B B B |

Load Z instruction is the same as LDX except that the data is stored in the RAM 350Z and "0"s are stored in corresponding addresses of RAM's 350X and 350Y.

FIVE RECALL INSTRUCTIONS (5-9)

Recall instructions load the first vertice Vo of each face into RAM's 350 and initiates generation of the associated face.

| | 15 | 11 | 8 7 6 | 4 3 | 0 |
|---|---|---|---|---|---|
| RCA (9) | 1 0 0 1 | A A A A | R S S S | | B B B B |

Recall A instruction causes the single subsequent set of coordinates for the first vertice of a face, which typically is also an initialization vector Vo, to be loaded into the first location of RAM 350X, RAM 350Y, and 350Z. The other vertices of the current face have already been entered into RAM's 350 in CCW order as 16 bit coarse or fine data under one of the load instructions (0-4). These other vertices are now recalled in CCW order from RAM's 350 beginning with address A of RCA. Normal 24 bit resolution (R=3) and coarse 16 bit resolution (R=2) have been previously described. S is a scale factor. When S=7, the current face is displayed full size. As S decreases the size of the current face is reduced by factors of 2.

| | 15 | 11 | 8 7 6 | 4 3 | 0 |
|---|---|---|---|---|---|
| RXY (8) | 1 0 0 0 | A A A A | R S S S | | B B B B |

Recall XY instruction causes the single subsequent set of first vertice Vo coordinates to be loaded into the first address of RAM 350X and then the first address of RAM 310Y. RAM 350Z is unaffected. The face generation then proceeds as described under RCA.

| | 15 | | | | 0 |
|---|---|---|---|---|---|
| RCX(5) | 0 1 0 1 | A3 A2 A1 A0 | R | S2 S1 S0 | B3 B2 B1 B0 |

Recall X instruction causes the single subsequent X coordinate of the first vertice Vo to be loaded into the first address of RAM 350X. RAM's 350Y and 350Z are unaffected.

| | 15 | 11 | 8 7 6 | 4 3 | 0 |
|---|---|---|---|---|---|
| RCY (6) | 0 1 1 0 | A A A A | R S S S | | B B B B |

Recall Y instruction causes the single subsequent Y coordinate of the first vertice Vo to be loaded into the first address of RAM 350Y; RAM's 350X and 350Y are unaffected.

| | 15 | 11 | 8 7 6 | 4 3 | 0 |
|---|---|---|---|---|---|
| RCZ (7) | 0 1 1 1 | A A A A | R S S S | | B B B B |

Recall Z instruction causes the single subsequent Z coordinate of the first vertice Vo to be loaded into the first address of RAM 310Z; RAM's 350X and 350Y are unaffected.

| | 15 | | | | 0 |
|---|---|---|---|---|---|
| RCL (10) | 1 0 1 0 | A3 A2 A1 A0 | S2 S1 S0 | | B3 B2 B1 B0 |

Recall Load instruction does not load any new data into RAM's 350 but is the same as RCX in other respects. RCL is used to hold the previous Vo in order to construct another face contiguous with or proximate to the previous face using the previous Vo as the first vertice or a landmark point for establishing the position of the vertices of the contiguous face.

OTHER INSTRUCTIONS

| | 15 | 12 11 | 10 | 9 8 | 4 3 | 0 |
|---|---|---|---|---|---|---|
| CIF (11) | 1 0 1 1 | SEL AXIS | | S± | I I I I | B B B B |

Color Intensity Flag instruction is followed by B additional words, i.e.,

| | 15 8 | 7 6 5 | 4 | 3 2 | 1 0 |
|---|---|---|---|---|---|
| CIF1(B=1) | Spares | OBJ CODE | FB | IOS | VER RES |

| | 15 | 10 9 | 4 3 | 2 1 | 0 |
|---|---|---|---|---|---|
| CIF2(B=2) | Color− | Color+ | Col Sel | Spares | | which define the visual characteristics of each data base feature (face, line, or point). The visual characteristic of certain cultural objects such as signal beacons and runway lamps are a function of viewing direction and require directional data. SEL AXIS identifies the viewing axis to which the CIF data pertains:

SEL AXIS=00: The color and intensity of the object is uniform in all directions--ordinary object.

SEL AXIS=01: the color of the object depends on the direction of viewing along the X axis—bidirectional object.

SEL AXIS=10: bidirectional along Y axis.

SEL AXIS=11: bidirectional along Z axis.

S±(SIGN±) identifies the direction of view of the object along the axis identified by SEL AXIS. COLOR+ identifies the color of the object when viewed from the S+ direction, and COLOR- identifies the color of the object when viewed from the S- direction. COL SEL permits ordinary non-direction features to be displayed in a color from COLOR+ (COL SEL=O) or from COLOR- (COL SEL=1). I (INTENSITY) determines the intensity of the data base feature. When only an intensity change is required to display the current object, only CIFO (B=0) is employed. OBJ CODE identifies the type of object to be recalled:

OBJ CODE=000: 3 dimensional face (a face having a vertical component). Most 3D faces form part of a 3 dimensional object such as the side or top of a building.

=001: Spare.

=010: Spare.

=011: Face to line, such as runway stripes which narrow down to a line with distance.

=100: Sky.

=101: Line.

=110: Light point.

=111: 2 dimensional face, a completely horizontal face in the X-Y plane.

The use of Recall instruction as illustrated in FIG. 2a is different for two dimensional faces on the X-Y ground plane (which always face the observer) and faces of a 3 dimensional object (which are sometimes occluded), as illustrated in FIG. 2. Two dimensional faces are identified by a 2D face object code in the previously loaded CIFI data. RCX computes the vertices of each face by starting with the X, Y, Z coordinates of Vo stored in the first address of RAM's 350 and combining additional vector coordinates from RAM's 350 starting at address A. B is the number of vertices in the face, and, since Vo is the first vertex, B-1 additional vectors (Delta V1, Delta V2, ... Delta VB-1) are required to generate the other vertices. The vertices are always stored and retrieved in counter-clockwise order. Three dimensional faces are identified by a 3D object code. Vo is not used as a vertex for 3D faces, so that B additional vectors (Delta V1, Delta V2, ... Delta VB) are required to display a face having B vertices. The RAM addresses containing the additional vector coordinates for 3D faces are provided by one or two data words 3DV1 and 3DV2 following the X data word or words. Each additional vector in 3D recall describes the position of a vertex with respect to Vo as opposed to a 2D recall, in which each additional vector describes the position of a vertex with respect to the previous vertex. The address format for additional 3D vectors in RAM 350 is

```
       15    VR        VR        VR      VR  0
V1    |D D D D|C C C C|B B B B|A A A A|  first word
       15    VR        VR        VR      VR  0
V2    |H H H H|G G G G|F F F F|E E E E|  second word
```

If the face has four or fewer vertices, only the first word is used. The order in which the RAM 350 addresses are used is reverse alphabetical. For example, when recalling a face having five vertices, the first vertex will be computed using the vector stored at E. The last vertex is always stored at A. A in the RCX instruction is also the address of the normal vector stored in normal RAM 440N. The normal vector is used to test the visibility of a face and must have been previously loaded in normal RAM 440 N using a LDN instruction (described hereinafter). Scale factor is the same for a 3D face as for a 2D face.

FB identifies data fed back for CRT correction to eliminate ballistic nonlinearities and provide a true display.

IOS identifies data displayed on the instructor's monitor 28 only.

VER RES determines the scan line density (vertical display resolution in horizontal lines per vertical scan).
 VER RES=000: 128 lines low resolution for rapidly painting structureless large areas such as the sky with a defocused electron beam.
  =001: 256
  =010: 384
  =011: 512
  =100: 640
  =101: 768
  =110: 896
  =111: 1024 lines high resolution for painting detailed objects.

```
          15      12 11   8 7                 0
LCD (15) |1 1 1 1|       |C C C C C C C C|
```

Load Correct Data instruction enters C vertices with corrected CRT coordinates.

```
          15
STG (12) |1 1 0 0|A A A A|C C C C C C C C|
```

Control String instruction causes the display of string of C equally spaced lights or four-sided two dimensional faces, depending on the CIF1 OBJ CODE. The first light of a string is displayed at the Vo+A position and a spacing vector stored at A+1 is used to fix the position of the second light and all successive lights until C lights have been displayed. The first vertex of the first face of a string of faces is displayed at the Vi+A position and the other three vertices are found successively adding the vectors stored at RAM's 350 addresses A+1, A+2, and A+3. The vector stored at A+4 locates the first vertex of the next face with respect to the last vertex of the current face.

```
          15      12          8 7 6 5 4 3     0
LDH (13) |1 1 0 1|A A A A|0|C C|B B B B|
```

Control Load H instruction loads the H rotation matrix on data bus 307 into RAM 410H in rotation stage 62. The elements of the rotation matrix are in 16 bit 2's complement form, and each address of RAM 410H will store three elements. The rotation matrix multiplies the translated X, Y, and Z coordinates in the following form:

$$\begin{bmatrix} h11 & h12 & h13 \\ h21 & h22 & h23 \\ h31 & h32 & h33 \end{bmatrix} \begin{bmatrix} XT \\ YT \\ ZT \end{bmatrix} \quad \begin{bmatrix} XR \\ YR \\ ZR \end{bmatrix} \begin{array}{l} = h11\ XT + h12\ 1/T + h13\ ZT \\ = h21\ XT + h22\ YT + h23\ ZT \\ = h31\ XT + h32\ YT + h33\ ZT \end{array}$$

The element data follows the LDH instruction in the following order:
h31, h32, h33, h21, h23, h11, h12, h13.
The matrix is always stored in the first three addresses of RAM 410H, so A=0, the initial address and B=3, the number of matrix rows. C is the channel number associated with rotation matrix.

```
          15    12 11    8 7 6 3        0
LDN (14) |1 1 1 1|A A A A|1|    |B B B B|
```

Control Load N instruction loads B face normal vectors on data bus 307 into normal vector RAM 440N in rotation stage 62, starting at address A. Each vector consists of three 16 bit data words in order Nx, Ny, Nz. The Control Load N will therefore always be followed by three B words of data. Each address in normal RAM 410N is associated with a three dimensional face of identical address in RAM's 350. Both RAM's are addressed during the Control Recall of a 3D face.

SECTION VII

DETAILED DESCRIPTION OF DIGITAL VISUAL COMPUTER 12

Each stage of digital visual system 12 is shown in detail in FIGS. 3 through 9. Preferred embodiments are disclosured at the detailed logic level. Each component is described by function, input-output characters, or conventional nomenclature to enable one skilled in the arts of simulation, digital design, and computer programming to practice the invention. The components are additionally designated by the manufacturer's IC type number from the following integrated circuits data books:

Texas Instruments Incorporated
"The TTL Data Book of Design Engineers"
First Edition, Copyright 1973
National Semiconductor Corporation
"Digital Integrated Circuits"
January 1974
Advanced Micro Devices Inc.
"Advanced Micro Devices Data Book"
Copyright 1974 unless otherwise specified. Further, many inverters are employed throughout CDIG system 10 for buffering signals with multiple loads. These buffer inverters are type 74SO4 unless otherwise stated.

SECTION VIII

TRANSLATION STAGE 60

GENERAL OPERATION

FIG. 3 shows translation stage 60 of image processor 42 and a portion of controller 46. Controller 46 receives image data in sequential order from computer 40 at input 302 of random access memory 304. The image data is arranged in data blocks M bits wide and N words long, which in the embodiment shown in 16×1024. RAM 304 periodically handshakes with a core memory in GP computer 40 to reproduce each block of data. Image data is sequentially transferred from RAM 304 through a buffer register 306 to image data bus 307 in response to load pulses from interface controller 46.

Each instruction word on bus 307 is loaded into instruction registers 310 A and B which forwards the code bits (four MSB's) to control logic 70. Control logic 70 then selectively activates the remaining blocks of translation stage 60 for processing the subsequent B words of data appropriately. Load instructions (0–4) cause control logic 70 to send WRITE to RAM's 350, which then writes the subsequent B data words starting at ADDRESS A. Counter 320A increments ADDRESS A while counter 320B decrements down from B. When the B count expires, B=0 is forwarded to logic 70 and the next instruction is loaded into instruction registers 310.

Vp is loaded into RAM's 350 by a Load A instruction (R=3) immediately after each handshake, and Vp is always positioned at the same address (address 1). Next, B words of delta data vectors is entered by another load instruction.

Recall instructions (5–9) load the Vo associated with the previously loaded B words of delta data. Each Vo is positioned at the same address in RAM (address 0). The recall instruction causes control logic 70 to forward READ to RAM's 350, and the B words of delta delta are recalled from RAM's 350 and processed through the remainder of translation stage 60.

CIF instruction causes control logic 70 to forward LOAD to CIF register 330 to receive SEL AXIS, SIGN±, and Intensity data from instruction registers 310. B subsequent data words are entered into CIF-1 register 331 and CIF-2 register 332 where the CIF data is temporarily held. The CIF data is advanced into corresponding CIF registers 460 in rotation stage 62 as Vf data enters rotation stage 62 from normalization register 380.

Three dimensional vertex registers 341 and 342 receive the addresses of vertices of 3D faces in RAM 350. The addresses in registers 341 and 342 address RAM's 350 via address counter 320A.

RAM's 350 write image data from interface controller 46 after load instructions and read image data after recall instructions. RAM's 350 temporarily store Vp and delta V's until the associated Vo is entered permitting the faces to be generated.

Scalers 360 (X, Y, and Z) control the size of the displayed image by expanding or contracting the X, Y, and Z position coordinates by factors of two. S data from register 310B shifts the binary decimal point to effect the scaling.

Accumulators 370 receive the X, Y, and Z position coordinates and perform the following translation computations (illustrated in FIG. 2):

basic translation: from the origin 210 of data base coordinate system to the origin 220 of aircraft 14 coordinate system $$Vp+Vo=Vt$$

2D translation: from initial vertex to the remaining vertices sequentially—cumulative (landing strip 230)

$$Vt+Delta\ V1=Vt1$$

$$Vt1+Delta\ V2=Vt2$$

$$Vtn+Delta\ (Vn+1)=V(tn+1)$$

3D translation: from initial vertex to each remaining vertex separately—non cumulative (hanger 240)

$$Vt+Delta\ V1=Vt1$$

$$Vt+Delta\ Vn=Vtn$$

Normalization registers 380 (X, Y, and Z) loads the translated vertices Vt, and left shifts leading zeros (or ones for negative Vt's) in response to control logic 70. The first difference between the MSB and the second MSB in any of the normalization registers 380 generates a normalization complete signal, (NCS), back to control logic 70. Normalization complete in any of the normalization registers 380 stops the normalization process of all the registers insuring that the normalized points maintain consistent dimension units and remain on the same line of vision as viewed on display 82. Normalization has the advantage of reducing the 24 bit input image data into bits of normalized image data by eliminating either leading zeros (or ones for negative numbers). The data load is reduced to 66% with negligible loss in position resolution.

DETAILED DESCRIPTION

RAM 304 may be formed by a 16 bit×24 word RAM (sixteen 93415's, Fairchild) for holding the block of image data from GP computer 40.

Buffer register 306 may be formed by a 16 bit register (four 74S175's) followed by buffer inverters as required (74S04).

Register 310A may be an eight bit register (two 74S175's) for receiving four bits of code (4MSB) and four bits of RAM address (4LSB).

Register 310B and word counter 320B may be formed together by an eight bit down counter (two 74S163) for receiving the compliment of B and counting to 15. At B compliment=15, B=0 appears on the carry out terminal.

Address counter 320A may be a 2:1 inverting multiplexer (74S158) followed by a four bit up counter (one 74S163). During load and recall instructions, counter 320A increments the start address AAAA to RAM's 350. While processing three dimensional faces counter 320A processes the face vertex addresses in three D registers 341 and 342.

CIF register 330 may be an eight bit register (two 74S175) for receiving eight bits of SEL AXIS, S± and Intensity Data from the CIF Load instruction.

CIF-1 and CIF-2 registers 331 and 332 may be 16 bit registers (four 74S174) for receiving two 16 bit words of CIF data immediately following the CIF instruction.

Three dimensional registers 341 and 342 may be eight 4 bit tristate registers (eight 8551) preceded by a 3 line to 8 line decoder (one half 74S139) which enables one of the eight tristate registers in response to the three LBS's of B from word counter 320B.

RAM 350X may be a 24 bit RAM (six 74S189's) to accomodate the 24 bits of X coordinate image data. The 24 bit RAM is preceded by a 2:1 8 bit multiplexer (two 74S158) between a pair of true compliment zero one elements (two 74H87's each). During 16 bit fine resolution (R=1) the right hand zero one element forwards the 8LSB's of the image data to the 24 bit RAM, and the righthand zero one element enters all zeros (or all ones depending on the sign of the image data). During 16 bit coarse resolution (R=2) the right hand zero one element enters all zeros and the lefthand zero one element forwards the 8 MBS's.

Scaler 360x may be formed by a flow through right shifter device (twelve 25S10's AMD) in response to S data from register 310B counter.

Accumulator 370x may be a 24 bit adder (six 74283's) for receiving data at the A input, followed by a 24 bit return register (six 74S175's) which outputs to the B input. Vp is processed through the adder and return register, and returned to the B input. Vo is loaded at the A input and adder to Vp to form Vt and returned to the B input. Delta data is then loaded at the A input and added to Vt to form the remaining vertice vectors Vf1-Vfn, which are advanced through the return register to a 24 bit buffer register (four 74S174's) where the Vf's are held until normalizer 380x is free.

Normalizer 380x may be formed by a 24 bit shift register (three 74199) plus a Buffer register (four 74S174's) which holds the normalized Vf's until rotation stage 62 is free to handle the next Vf.

SECTION IX

ROTATION STAGE 62

GENERAL-H MATRIX

FIG. 4 shows rotation stage 62 of image processor 42 which multiplies the translated point vectors Vf1-Vfn from translation stage 60 by the rotation matrix H provided on data bus 307 to produce a rotated or channel vectors Vc (XcYcZc):

Xc  Xf
Yc=[H] Yf
Zc  Zf

Each channel corresponds to the perspective view from one window of aircraft 14.

The rotation matrix H is developed from yaw (Y, left), pitch (P, down), and roll (R, right) motions by flight simulator 16 using conventional software. The order of rotation is Y followed by P, and the matrices for the separate rotations from translated to rotated pilot eye or channel coordinates are as follows:

$$HY = \begin{bmatrix} \cos Y & \sin Y & 0 \\ -\sin Y & \cos Y & 0 \\ 0 & 0 & 1 \end{bmatrix}$$

$$HP = \begin{bmatrix} \cos P & 0 & -\sin P \\ 0 & 1 & 0 \\ \sin P & 0 & \cos P \end{bmatrix}$$

$$HR = \begin{bmatrix} 1 & 0 & 0 \\ 0 & \cos R & \sin R \\ 0 & -\sin R & \cos R \end{bmatrix}$$

The composite matrix H describing this rotation is given by the matrix product:

[H]=[HR][HP][HY]=3 columns×3 rows matrix

The aircraft attitude matrix H is constant for each frame and is therefore computed only once per frame for each channel.

The three elements of the first column of the H matrix are entered into H RAM 410x by WRITE from control logic 70 immediately subsequent to the Load H instruction. The first column is then multiplied by the Xf coordinate of each of the translated vector series Vf1-Vfn in turn within column multiplier 420X. The three elements of the second and third columns of [H] are similarly entered into H RAM 410Y and 410Z (not shown). The nine products generated above are combined into Xc, Yc, and Zc by row multiplexer 424 and adder 430. The resulting Vc is forwarded to clipping stage 63.

GENERAL-VISIBILITY TEST

The rotation circuitry also provides the multiplication for the dot product visibility test for the faces which form three dimensional structures such as buildings:

Vt dot Vn=M cosP where: Vt is the translated vector extending from aircraft 14 to the first vertex of the face being tested; and Vn is the vector normal to the face being tested.

When cosP is negative, P is greater than 90° and the face is visible—on the front or exposed side of the building. When cosP is positive, P is less than 90° and the face is invisible—on the back side of the building. The sign bit of the dot product is employed for back side elimination—a simple occulting technique.

The Xn, Yn, and Zn coordinates of Vn are entered into N RAM's 410X, Y, and Z respectively immediately subsequent to the Load N instruction. Each coordinate is multiplied by the corresponding coordinate Xt, Yt, and Zt of Vt in multipliers 420 and the sign bit of the resulting quantity is forwarded to control logic 70.

DETAILED DESCRIPTION

H RAM 410x may be a 16 word by 16 bit sequential access memory (four 74S189's) for holding the three words in the first column of the 3×3 H matrix and providing 13 spare 16 bit addresses. WRITE and ADDRESS are provided by control logic 70.

N RAM 410x may be a 16 word by 16 bit random access memory (four 74S189's) for holding up to sixteen words of Xn which accomodates a three dimensional complex structure with up to sixteen faces.

Multiplicand register 414x may be a 16 bit buffer register (four 74S175's) for holding the current output of H and N RAM's 410x available to multiplexer 420x while the next address in RAM's 410 are accessed.

MUX 416x may be a 16 bit dual 4-1 multiplexer (three 74S153's) for providing four bits of output plus carry over bit.

Multiplier register 418x may be a 5 bit buffer register (one 74S174) for holding the output of MUX 416x available to multiplier 420x.

Column multiplier 420x may be formed by eight AM 25S05's (Advanced Micro Devices in 16 bit×4 bit configuration) followed by a buffer product register (three 74S175's) and operates as described in connection with Multiplier 330 in U.S. Pat. No. 3,996,672 which issued Dec. 14, 1976.

Row Multiplexer 424 may be a 20 bit 4 to 1 multiplexer (ten 74157's connected in parallel) which sequentially select the first row elements of each column for summing in row adder 430 to form Xc. The second and third row elements are likewise summed to provide Yc and Zc.

Row adder 430 may be a 20 bit adder (five 74783's) for summing the row products of the H matrix.

Accumulator 440 (three 74174's) returns intermediate sums to multiplexer 440 which are required in forming Vc.

Buffer registers 450 may be 18 bit registers (four 74175's) for holding Vc (Vx, Vy, Vz) prior to clipping.

CIF register 460 may be a 40 bit register for holding the CIF data from CIF registers 330, 331, and 332.

SECTION X

CLIPPING STAGE 63

GENERAL

FIG. 5 shows clipping stage 63 which eliminates points outside the viewing volume or pyramid of vision 250 shown in FIG. 2a. Pyramid of vision 250 has its vertex at the eye of the pilot (origin 220). The viewing volume in the embodiment shown is four sided, bounded by four planes defined by the four sides of the aircraft window.

Clipping is accomplished at the object face level. Vertices defining each face edge are processed in sequence through clipping stage 63 to determine whether the face is:

Case A—face completely within view,
Case B—face partially within view, or
Case C—face completely out of view.

Faces which are only partially in view (Case B) are intercepted by the sides of pyramid of vision 250. In the process of clipping, Case B faces are modified by the addition of new edges. The result is a modified closed polygon face that is completely within pyramid 250.

The position of any point or vertex relative to pyramid of vision 250 is defined by the distance of that vertex from each of the four sides of pyramid of vision 250. Referring to FIG. 2a point 254 forming the top of the flag pole 256 is positionally defined by the four window coordinates vl, vr, vb, vt in Zc plane 260. These window coordinates are calculated as follows:

$$vl = Kl\ Z + X$$

$$vr = Kr\ Z - X$$

$$vb = Kb\ Z + Y$$

$$vt = Kt\ Z - Y$$

where the K's are constants associated with the vertex angles of pyramid 250. For a square pyramid of vision having equal vertex angles A, $Kl = Kr = Kb = Kt = \text{Tan}(A/2)$. A point is inside the truncated pyramid of vision 250 if $vl \geq 0$, $vr \geq 0$, $vb \geq 0$, $vt \geq 0$, and $Zc > 0$.

The above window coordinates are calculated from Vc by window logic circuits 510-l, 510-r, 510-b, 510-t, and 510-z shown in FIG. 5 (only 510-1 is shown in detail). Window circuit 510-1 receives Xc and Zc from 1:r multiplexer 520 for temporary storage in interior working registers 530. Adder 540 and inverter 544 cooperate to perform the required addition. Window coordinates vl and vt are forwarded to projection stage 64 to become display coordinates Xd and Yd, and Zc is forwarded for range attenuation effects.

The signs of the window coordinates are combined in a single five-bit out-code (OC):

OC=sign 1, sign r, sign b, sign t (and sign Z) where the sign of each window coordinate is "0" for positive and "1" for negative. The origin of each window coordinate is the corresponding boundary of image window 262 with the negative direction extending away from image window 262 (see FIG. 2b, left for vl, right for vr, up for vb, and down for vt). The positive direction for each window coordinate is toward the center of image window 262. The four boundaries of pyramid 250 subdivide the positive half-space in front of aircraft 14 into nine regions. The out-code of each Vf identifies the region in which the point or vertex is located. The out-code for each region of the two-dimensional projection of pyramid 250 is shown in the following table:

| upper left region | upper region | upper right |
|---|---|---|
| 1001 (0) | 0001 (0) | 0101 (0) |
| left region | visible region window 262 | right region |
| 1000 (0) | 0000 (0) | 0100 (0) |
| lower left region | lower region | lower right region |
| 0101 (0) | 0010 (0) | 0110 (0) |

The relative position of any face edge to pyramid 250 can be found by examining the outcodes of the end points of the edge. If both vertices are behind the Zc=0 plane (that is behind the pilot's eye where Zc is negative), then sign Z(1)=sign Z(2)=1 and the face edge is not visible and can be rejected. If both vertices are in front of the Zc=0 plane (in front of the pilot's eye where Zc is positive), then sign Z(1)=sign Z(2)=0. If the face edge intersects the Zc=0 plane, then sign Z1≠sign Z2. The intersection is found and only the portion of the edge extending in front of the pilot's eye need be considered.

Three further possibilities for the relative position of a face edge with respect to pyramid 250:

Case 1: Both ends of the face edge are within view. No clipping is necessary: OC(1)=0000(0), OC(2)=0000 (0).

Case 2: One end of the face edge is within view and the other end is outside. The face edge intersects pyramid 250: OC(1)=0000(0) and OC(2)≠0000(0) or OC (1)≠0000(0) and OC(2)=0000(0).

Case 3: Both ends are outside pyramid of vision 250: OC(1)≠0000(0) and OC(2)≠0000(0).

In Case 3, definite decisions can be made only if the end points of the edge are either both to the right or both to the left (sign 1(1)=sign 1(2)=1(negative) or sign r(1)=sign r(2)=1(negative)). Furthermore, if OC(1)=OC(2) ≠0000, both ends are outside, in the same region. In all these cases the face edge can be rejected. The rejection criteria can be expressed as a Boolean function (R) of the two out-codes. If R=0, none of the above rejection criteria are satisfied, and a part of the face edge boundary may go through image window 260.

Whenever Case 2 is found in the clipping process, the intersection of each face edge and pyramid of vision 250 is determined by window circuits 510 and the clipping portion of control 70 using a binary search technique. The algorithm for the search is as follows:

(A) Let the window coordinates of the vertex inside image window 260 be Vin and the outside coordinates be Vout.
(B) The midpoint between Vin and Vout is calculated.
(C) If the midpoint is within pyramid 250, Vin is replaced by the midpoint.
(D) If the midpoint is outside, Vout is replaced by the midpoint.
(E) The process continues until the distance of the midpoint from one side of pyramid 250 is less than the termination tolerance.

There remains the problem of modifying the edges of clipped faces. In some situations the intersections of the face edges and pyramid of vision 250 define the new face edge. In other situations one or more corners of the window must be inserted into the sequence of vertices to complete the closed polygon face.

In a special case all vertices are outside pyramid 250 and the edges do not intersect pyramid 250. There remains ambiguity as to whether the face is within view. Referring to FIG. 2b showing image window 262, 4 rays (R1, R2, R3, and R4) extend from the four corners (C1, C2, C3, and C4) of window 260. If a ray is intersected an odd number of times by the edges of the polygon face, then the corresponding corner is surrounded by the polygon. This technique can be implemented by inspecting the out-codes of the adjacent vertices defining each edge. The criterion for crossing the rays is very similar to the rejection criterion and is obtained by logical operations. As an example, R1 is crossed if sign t(1)=sign t(2)=1 and sign 1(1)≠sign 1(2).

SECTION XI

PROJECTION STAGE 64

GENERAL

FIG. 6 shows projection and clipping stage 64 of image processor 42 which projects three-dimensional window coordinates vl, vt, and Vz from clipping stage 63 into a two-dimensional vector Vd (Xd, Yd). The projected vectors Vd define the end points of each face edge for face generation stage 65. The projection is accomplished by dividing vl and vt by Zc through a binary division nonrestoring technique (described in "Digital Arithmetic-I" by Y. Chu pages 39–43). Z/2 registers 610-1 and 610-t load the divisor Zc/2, and MUX/Register 620-1 and 620-t select and load the dividend vl/2 and vt/2 in response to control logic 70. The inputs to registers 610 and 620 are right-shifted by one digit to establish the division by two. Arithmetic logic unit ALU 630-1 and 630-t then receive the dividends through shift return loops 623-1 and 623-t, or subtract Zc/2 thereto in response to a ± function from logic 70. The dividend ±Zc/2 term is loaded into MUX's 620, returned to ALU's 630, and then combined with another ±Z/2. The output of ALU's is slew wired with respect to the input to MUX's 620 causing a division by two right shift. The vl/Vz and vt/Vz quotients are generated one bit at a time, MSB first, by comparing the sign bit (MSB) of Zc with the sign bit of the partial remainders with MUX 620 through sign gates 636-1 and 636-t. The quotient bits individually enter quotient registers 640-1 and 640-t, and are left-shifted by control logic 70. Zc on line 592 from range register 590 is loaded into renormalization register 650 and right-shifted by control logic 708 the same number of places as were left-shifted in normalizer 370 in translation stage 60. Color, intensity, and flag data on line 592 from CIF register 590 is loaded into CIF register 660 in response to control logic 70.

DETAILED DESCRIPTION

Vz12 register 610 may be a 24 bit register (four 74S174's). MUX/Registers 620 may be 24 bit 2:1 multiplexers (five 74S298's) with storage.

ALU's 630 may be 16 bit flowthrough arithmetic logic units (four 74S181's+one 74S182).

Sign gates 636 may be exclusive OR gates (74S86).

Quotient registers 640 may be 12 bit shift registers (three 74164's) for receiving the projected data Xd and Yd one bit at a time as it is generated by ALU's 630.

Zc register 650 may be a 24 bit shift register (six 74S195's).

CIF register 660 may be a series of 74S174's.

SECTION XII

EDGE STAGE 65

GENERAL

FIG. 7 shows edge stage 65 having Xd processor 706X and Yd processor 706Y which receive projected face vertex coordinates (Xd and Yd) from projection stage 64 and provides face edge lists to display generator 44. Each edge is defined by edge data including a starting point (Xds, Yds), the Y coordinate of the termination point (Ydt), plus the slope of the edge (delta X/delta Y).

The Y coordinates of each set of face vertices (Xd and Yd) are loaded into current Y multiplexer 710 and advanced to previous Y register 716 in CCW order as defined in data base 48. Each current Y coordinate (Ydc) and previous Y coordinate (Ydp) are forwarded to adder 720 for calculating a delta Y for each face edge or pair of points (delta Y=Ydc−Ydp). Simultaneously, each Ydc and Ydp are entered into Y start multiplexer 730s and Y terminate multiplexer 730t. The starting Y coordinate Yds is the end point of each face edge that is scanned first on CRT 82; and the terminate Y coordinate Ydt is scanned last. In the embodiment shown, the conventional top to bottom scan is employed. Therefore, the start point Yds is always the smaller of the two adjacent points Ydc and Ydp. The sign bit of delta Y (SIGNΔY) defines which is smaller, Ydc or Ydp, as follows:

for +delta Y: for −delta Y
Ydc=Ydt, and Xdc=Xdt: Ydc=Yds, and Xdc=Xds
Ydp=Yds, and Xdp=Xds: Xdp=Xdt, and Xdp=Xdt and activates multiplexers 730s and 730t accordingly. Slope divider 740 provides the slope of each edge face by computing delta X/delta Y for the corresponding pair of vertices. Variable delta generator 78X provides the appropriate change in X along each edge between scan lines as a function of the resolution code and the slope of that edge.

The face edges are arranged in scan order by Yds sorter 750 according to the smallest Yds. Each edge data set is loaded into sorter 750 in CCW order and forwarded to image generator 44 in order of smallest Yds for accomodating the top to bottom scan.

DETAILED DESCRIPTION

Xd processor 706X has the same hardware as Yd processor 706Y, and is therefore not shown in detail.

Current Y mux-register 710 may be a 12 bit 2:1 multiplexer-register (three 74298's) for the current vertex of each face as the vertices are received in CCW order from quotient registers 640-1 and 640-t.

Previous Y register 716 may be a 12 bit storage register (two 74174's) for holding the vertex just preceding the current vertex.

First vertex Y register 718 may be a 12 bit storage register (two 74174's) for holding the first vertex while the intermediate vertices are processed. The first vertex is loaded into current mux-register 710 as the last vertex is advanced to previous vertex status to form the last edge of the face.

Adder 720 may be a 12 bit adder (three 74283's) for calculating delta Y=Ydc−Ydp, and forwarding SIGN Y to Y and X multiplexers-registers 730s and 730t.

Inverter 722 may be a 12 bit inverting buffer (two 74S04's) for inverting Ydp into -Ydp. The carry in on adder 720 is forced to 1 to complete the complement of Ydp.

Start point and terminate point multiplexer-register 730 may be 12 bit 2:1 multiplexer-registers (three 74298's each) for simultaneously holding both Ydc and Ydp available for selection as either Yds or Ydt.

Delta Y register 724 may be a 12 bit storage register (three 74S175's) for holding delta Yc while divider 740 forms the slope (delta Xp/delta Yp) for the previous edge. Additionally register 724 may include a zero detect circuit (one 74S30) for providing delta Y=0 to control 70 when the slope is horizontal and the edge may be omitted from further processing.

Divider 740 may be a 12 input bit-20 output bit binary division nonrestoring divider as described in projection stage 64, for calculating slope=data X/delta Y. The divided delta X may be right shifted into additional shift register (one 74166) for scaling down the resulting slope to accomodate a Y increment of one raster line. In the embodiment shown the right shift is nine places to accomodate a 1024 scan line, interlaced display (2 to the 9th=512).

Sorter 750 may be a 12 bit key-96 bit non key sorter for output edge data in order ascending of Yds, formed by:

(a) a 16 word 12 bit key data RAM (three 74S189's) for receiving and storing the key data (Yds) in input order.
(b) a 16 word 5 bit pointer RAM (two 74S189's) for storing the RAM pointers.
(c) a three level pointer pushdown stock (two mux-registers 74298's—first level, one 74S174—second level, and one 74S174—third level) for manipulating pointers into sorted order each time a new key is received by the key data RAM.
(d) address counter (one 74161) and smallest key pointer register (one 74S174) for generating RAM addresses and storing the current smallest key RAM address.
(e) RAM address multiplexer (two 74S153's) and a pointer RAM input multiplexer (three 74S153's) which cooperates with the three level stack and address counter for selecting RAM addresses and the pointer RAM input.
(f) an existing key register (three 74S175's) and comparator (three 74S85's) for determining where to insert the input key among the existing key in the key data RAM. The existing key register also stores key data to be advanced to image generator 44.
(g) non key data output register (twenty-four 74S175's) for storing non key data (Xds, raster delta X, Ydt, Zc, and CIF) to be advanced to image generator 44.

SECTION XIII

CONTROL LOGIC

Processor control logic 70 responds to instruction code and data flags contained in the data flow from data base 48 for processing the coordinate data through image processor 42. The flow tables described below disclose the logic involved in controlling each stage of image processor 42. Various hardware circuit configurations could incorporate this logic.

| TRANSLATION STAGE 60--CONTROL LOGIC FLOW TABLE | | |
|---|---|---|
| I. | TRANSFER INSTRUCTION WORD: CONTROLLER 46 TO REGISTER 310 | |
| | STEP IA: | (1) Maintain LOAD signal on instruction register 310. |
| | | (2) Load next instruction from buffer register 306 into instruction regis- |

TRANSLATION STAGE 60--CONTROL LOGIC FLOW TABLE -continued

|      |      |      |      |      |
|------|------|------|------|------|
|      | | ter 310 (LOAD). | | |
|      | DECISION IA: | Is image data available to translation stage 60 on data bus 307? (DAV) YES--STEP IB  NO--STEP IA | | |
|      | STEP IB: | (1) Clear accumulator 370 (CLR). (2) Clear scaler data "S" from scale register in scaler 360. (3) Clear address counter 320A (CLR). (4) Set DAR from control logic 70, wait for DAV from interface controller 46. | | |
|      | DECISION IB: | Decode four MSB of instruction in register 310A to identify one of sixteen instructions (0-15). | | |
| II.  | LOAD X INSTRUCTION--LDX (0) | | | |
|      | STEP IIA: | (1) Load address counter 320A with four bits of address "A" (LOAD). (2) Unit decrement word counter 320B (DEC). | | |
|      | DECISION IIA: | DAV? YES--DECISION IIB   NO--DECISION IIA | | |
|      | DECISION IIB: | What is R? | | |
|      |      | R=1 (fine 16 bit) | R=2 (coarse 16 bit) | R=3 (normal 24 bit) |
|      |      | 1. Load 16 LSB from bus 307 into RAM 350X. | 1. Same as DECISION IIB (R=1) 1 through 3 except load 16 MSB at 1. | 1. Load 16 LSB from bus 307 into RAM 350X. |
|      |      | 2. Load zeros into RAMs 350 Y and Z. | . | 2. Request DAR, wait for DAV. 3. Load 8 MSB from bus 307 into RAM 350X. |
|      |      | 3.a. Unit increment address counter 320A (INC). | . | 4. Load zeros into RAMs 350 Y and Z. |
|      |      | 3.b. Unit decrement word counter 320B (DEC). | . | 5. Same as DECISION IIB (R=1)3. |
|      |      | 3.c. Set DAR, wait for DAV. | . | . |
|      |      | 4. DECISION IIC. | 2. DECISION IIC. | 6. DECISION IIC. |
|      | DECISION IIC | Is word count in register 320 B=0 YES--STEP IA  NO--DECISION IIA | | |
| III. | LOAD Y INSTRUCTION--LDY (1) | | | |
|      | STEP IIIA: | Same as STEP IIA. | | |
|      | DECISION IIIA: | DAV? YES--DECISION IIIB | NO--DECISION IIIA | |
|      | DECISION IIIB: | What is R? | | |
|      |      | R=1 | R=2 | R=3 |
|      |      | 1. Load 16 LSB from bus 307 into RAM 350Y. | 1. Same as DECISION IIIB (R=1)1 through 3 except load 16 MSB at 1. | 1. Load 16 LSB from bus 307 into RAM 350Y. |
|      |      | 2. Load zeros into RAMs 350 X and Z. | . | 2. Set DAR, wait for DAV. |
|      |      | 3. Same as DECISION IIB | . | 3. Load 8 MSB from bus 307 into RAM 350X. |
|      |      | (R=1)3. | . | 4. Load zeros into RAMs 350 X and Z. |
|      |      | . | . | 5. Same as DECISION IIB |
|      |      | . | . | (R=1)3. |
|      |      | 4. DECISION IIIC. | 2. DECISION IIIC. | 6. DECISION IIIC. |
|      | DECISION IIIC: | Is word count in register 320 B=0? YES--STEP IA  NO--DECISION IIIA | | |
| IV.  | LOAD Z INSTRUCTION--LDZ (2) | | | |
|      | STEP IVA: | Same as STEP IIA. | | |
|      | DECISION IVA: | DAV? YES--DECISION IIB | NO--DECISION IVA | |

TRANSLATION STAGE 60—CONTROL LOGIC FLOW TABLE -continued

| | | | | | |
|---|---|---|---|---|---|
| | DECISION IVB: | What is R? | | | |
| | | R=1 | R=2 | R=3 | |
| | | 1. Load 16 LSB from bus 307 into RAM 350Z. | 1. Same as DECISION IVB (R=1) 1 through 3, except load 16 MSB at 1. | 1. Load 16 LSB from bus 307 into RAM 350Z. | |
| | | 2. Load zeros into RAMs 350 X and Y. | | 2. Set DAR, wait for DAV. | |
| | | | | 3. Load 8 MSB from bus 307 | |
| | | 3. Same as DECISION II | . | into RAM 350Z. | |
| | | (R=1)3. | . | 4. Load zeros | |
| | | . | . | into RAMs 350 | |
| | | . | . | X and Y. | |
| | | . | . | 5. Same as DECISION IIB | |
| | | . | . | (R=1)3. | |
| | | 4. DECISION IVC. | 2. DECISION IVC. | 6. DECISION IVC. | |
| | DECISION IVC: | Is word count in register 320 B=0? | | | |
| | | YES—STEP IA    NO—DECISION IVA | | | |
| V. | LOAD XY INSTRUCTION—LXY (3) | | | | |
| | STEP VA: | Same as STEP IIA. | | | |
| | DECISION VA: | DAV? | | | |
| | | YES—DECISION VB    NO—DECISION VA | | | |
| | DECISION VB: | What is R? | | | |
| | | R=1 | R=2 | R=3 | |
| | | 1. Load 16 LSB from bus 307 into RAM 350X. | 1. Same as DECISION VB (R=1) 1 through 5, except load 16 MSB at 1 and 3. | 1. Load 16 LSB from bus 307 into RAM 350X. | |
| | | 2. Set DAR, wait for DAV. | | 2. Set DAR, wait for DAV. | |
| | | 3. Load 16 LSB from bus 307 | | 3. Load 8 MSB from bus 307 | |
| | | into RAM 350Y. | . | into RAM 350X. | |
| | | 4. Load zeros | . | 4. Set DAR, | |
| | | into RAM 350Z. | . | wait for DAV. | |
| | | 5. Same as DECISION IIB | . | 5. Load 16 LSB from bus 307 | |
| | | (R=1)3. | . | into RAM 350Y. | |
| | | . | . | 6. Set DAR, | |
| | | . | . | wait for DAV. | |
| | | . | . | 7. Load 8 MSB | |
| | | . | . | from bus 307 | |
| | | . | . | into RAM 350Y. | |
| | | . | . | 8. Load zeros | |
| | | . | . | into RAM 350Z. | |
| | | . | . | 9. Same as DECISION IIB | |
| | | . | . | (R=1)3. | |
| | | 6. DECISION VC. | 2. DECISION VC. | 10. DECISION VC. | |
| | DECISION VC: | Is word count in register 320 B=0? | | | |
| | | YES—STEP IA    NO—DECISION VA | | | |
| VI. | LOAD A INSTRUCTION—LDA (4) | | | | |
| | | STEP VIA: | Same as STEP IIA. | | |
| | | DECISION VIA: | DAV? | | |

-continued

TRANSLATION STAGE 60--CONTROL LOGIC FLOW TABLE

|  |  |  | YES--DECISION VIB | NO--DECISION VIA |
|---|---|---|---|---|
|  |  | DECISION VIB:<br>R=1<br>1. Load 16 LSB from bus 307 into RAM 350X.<br>2. Set DAR, Wait for DAV.<br>3. Load 16 LSB from bus 307 into RAM 350Y.<br><br>4. Set DAR, wait for DAV.<br><br>5. Load 16 LSB from bus 307 into RAM 350Z.<br><br>6. Same as DE-CISION IIB (R=1)3.<br>.<br>.<br>.<br>.<br>.<br>.<br>.<br>.<br>.<br>.<br>.<br>.<br>.<br>.<br>.<br>.<br>.<br>.<br>.<br>.<br>.<br>7. DECISION VIC. | What is R?<br>R=2<br>1. Same as DE-CISION VIB (=1) 1 through 6, except load 16 MSB at 1, 3, and 5.<br>.<br>.<br>.<br>.<br>.<br>.<br>.<br>.<br>.<br>.<br>.<br>.<br>.<br>.<br>.<br>.<br>.<br>.<br>.<br>.<br>.<br>.<br>.<br>.<br>.<br>.<br>.<br>.<br>.<br>2. DECISION VIC. | R=3<br>1. Load 16 LSB from bus 307 into RAM 350X.<br>2. Set DAR, wait for DAV.<br>3. Load 8 MSB from bus 307 into RAM 350X.<br>4. Set DAR, wait for DAV.<br>5. Load 16 LSB from bus 307 into RAM 350Y.<br>6. Set DAR, wait for DAV.<br>7. Load 8 MSB from bus 307 into RAM 350Y.<br>8. Set DAR, wait for DAV.<br>9. Load 16 LSB from bus 307 into RAM 350Z.<br>10. Set DAR, wait for DAV.<br>11. Load 8 MSB from bus 307 into RAM 350Z.<br>12. Same as DE-CISION IIB (R=1)3.<br>13. DECISION VIC. |
|  | DECISION VIC: | Is word count in register 320 B=0?<br>YES--STEP IA    NO--VIA |  |  |
| VII. | RECALL X--RCX (5) |  |  |  |
|  | STEP VIIA:<br>DECISION VIIA: | Clear address counter 320A (CLR).<br>DAV?<br>YES--DECISION VIIB |  | NO--DECISION VIIA |
|  | DECISION VIIB: | What is R?<br>R=2 (16 bit)<br>1. Load 16 MSB from bus 307 into RAM<br><br>350X.<br>2. Set DAR, wait for DAV.<br>. |  | R=3 (24 bit)<br>1. Load 16 LSB from bus 307 into RAM 350X.<br>2. Set DAR, wait for DAV.<br>3. Load 8 MSB from bus 307 into RAM 350X.<br><br>4. Set DAR, wait for DAV. |

TRANSLATION STAGE 60—CONTROL LOGIC FLOW TABLE
—continued

VIII. RECALL Y—RCY (6)

| | | 3. STEP XIIA. | 5. STEP XIIA. |

STEP VIIIA: Clear address counter 320A (CLR).
DECISION VIIIA: DAV?
    YES—DECISION VIIIB      NO—DECISION VIIIA DECISION VIIIB: What is R?

| R=2 (16 bit) | R=3 (24 bit) |
|---|---|
| 1. Load 16 MSB from bus 307 into RAM 350Y. | 1. Load 16 LSB from bus 307 into RAM 350Y. |
| 2. Set DAR, wait for DAV. | 2. Set DAR, wait for DAV. |
| | 3. Load 8 MSB from bus 307 into RAM 350Y. |
| | 4. Set DAR, wait for DAV. |
| 3. STEP XIIA. | 5. STEP XIIA. |

IX. RECALL Z—RCZ (7)

STEP IXA: Clear address counter 320A (CLR).
DECISION IXA: DAV?
    YES—DECISION IXB      NO—DECISION IXA DECISION IXB: What is R?

| R=2 (16 bit) | R=3 (24 bit) |
|---|---|
| 1. Load 16 MSB from bus 307 into RAM 350Z. | 1. Load 16 LSB from bus 307 into RAM 350Z. |
| 2. Set DAR, wait for DAV. | 2. Set DAR, wait for DAV. |
| | 3. Load 8 MSB from bus 307 into RAM 350Z. |
| | 4. Set DAR, wait for DAV. |
| 3. STEP XIIA. | 5. STEP XIIA. |

X. RECALL XY—RXY (8)

STEP XA: Clear address counter 320A (CLR).
DECISION XA: DAV?
    YES—DECISION XB      NO—DECISION XA DECISION XB: What is R?

| R=2 (16 bit) | R=3 (24 bit) |
|---|---|
| 1. Load 16 MSB from bus 307 into RAM 350X | 1. Load 16 LSB from bus 307 into RAM 350X. |
| 2. Set DAR, wait for DAV. | 2. Set DAR, wait for DAV. |
| 3. Load 16 MSB from bus 307 into RAM 350Y | 3. Load 8 MSB from bus 307 into RAM 350X. |
| 4. Set DAR, wait for DAV. | 4. Set DAR, wait for DAV. |
| | 5. Load 16 LSB from bus 307 into RAM 350Y. |
| | 6. Set DAR, wait for DAV. |
| | 7. Load 8 MSB 307 into RAM 350Y. |
| | 8. Set DAR, wait for DAV. |
| 5. STEP XIIA. | 9. STEP XIIA. |

XI. RECALL A—RCA (9)

TRANSLATION STAGE 60—CONTROL LOGIC FLOW TABLE

| | | | |
|---|---|---|---|
| | STEP XIA: | Clear address counter 320A (CLR). | |
| | DECISION XIA: | DAV? | |
| | | YES—DECISION XIB | NO—DECISION XIA |
| | DECISION XIB: | What is R? | |
| | | R=2 (16 bit) | R=3 (24 bit) |
| | | 1. Load 16 MSB from bus 307 into RAM 350X. | 1. Load 16 LSB from bus 307 into RAM 350X. |
| | | 2. Set DAR, wait for DAV. | 2. Set DAR, wait for DAV. |
| | | 3. Load 16 MSB from bus 307 into RAM 350Y. | 3. Load 8 MSB from bus 307 into RAM 350X. |
| | | 4. Set DAR, wait for DAV. | 4. Set DAR, wait for DAV. |
| | | 5. Load 16 MSB from bus 307 into RAM 350Z. | 5. Load 16 LSB from bus 307 into RAM 350Y. |
| | | 6. Set DAR, wait for DAV. | 6. Set DAR, wait for DAV. |
| | | . | 7. Load 8 MSB from bus 307 into RAM 350Y. |
| | | . | 8. Set DAR, wait for DAV. |
| | | . | 9. Load 16 LSB from bus 307 into RAM 350Z. |
| | | . | 10. Set DAR, wait for DAV. |
| | | . | 11. Load 8 MSB from bus 307 into RAM 350Z. |
| | | . | 12. Set DAR, wait for DAV. |
| | | 7. STEP XIIA. | 13. STEP XIIA. |
| XII. | RECALL LOAD—RCL (10) | | |
| | STEP XIIA: | (1) Load accumulator 370 (X, Y, and Z) with "Vo" from RAM 350 (X, Y, and Z) at address A=0. | |
| | | (2) Unit increment address counter 320A (INC). | |
| | | (3) Load accumulator 370 (X, Y, and Z) with "-Vp" from RAM 350 (X, Y, and Z) at address A=1 to form Vt=Vo-Vp. | |
| | | (4) Unit decrement word counter 320B (DEC). | |
| | DECISION XIIA: | Is the face part of a three dimensional object (is 3D flag set)? | |
| | | YES—STEP XIIB | NO—STEP XIIE |
| | | (Three dimensional case) | (Two dimensional case) |
| | STEP XIIB: | (1) Wait for DAV. | |
| | | (2) Load Three D register 341 (LOAD). | |
| | | (3) Set DAR, wait for DAV. | |
| | | (4) DECISION XIIB. | |
| | DECISION XIIB: | Is word count ≧ 4? Vertex pointers are packed four to one sixteen bit word. | |
| | | YES—STEP XIIC   NO—STEP XIID | |
| | STEP XIIC: | (1) Wait for DAV. | |
| | | (2) Load Three D register 342. | |
| | | (3) Set DAR, wait for DAV. | |
| | | (4) STEP XIID. | |
| | STEP XIID: | (1) Load address counter 320A with first vertex pointer "A" from register 310A. | |
| | | (2) Load scaler 360 with "S" from register 310B. | |
| | | (3) Load accumulator 370 with the Δ V data from RAM 350 as accessed by the pointer from the Three D buffers. | |
| | | (4) Clear address counter 320A. | |
| | | (5) Wait for DAR-T from Normalizer 380. | |
| | | (6) Enable FIRST VERTEX flag in CIF register. | |
| | | (7) Load the buffer register in accumulator 370 with the contents of the accumulator (LOAD-B). | |
| | | (8) Clear "S" register in scaler 360. | |
| | | (9) Clear accumulator 370. | |
| | | (10) Unit decrement word counter 320B. | |
| | | (11) Load H and N address register 386 with "A" (LOAD). | |

TRANSLATION STAGE 60--CONTROL LOGIC FLOW TABLE -continued

|  |  |
|---|---|
|  | (12) Load accumulator 370 with Vo. |
|  | (13) Unit increment address counter 320A. |
|  | (14) Load accumulator 370. |
|  | (15) Load address counter 320A with vertex address from Three D register 341 or 342. |
|  | (16) Load scale register within scaler 360. |
|  | (17) Load accumulator 370. |
|  | (18) Clear address counter 320A. |
|  | (19) Wait for DAR-T. |
|  | (20) Repeat items 7, 8, 9, and 10 of STEP XIID |
|  | (21) Same as STEP XIID items 12-19. |
|  | (22) Same as STEP XIID items 7-10. |
|  | (23) Load last vertex flag into CIF registers when B=0. |
|  | (24) DECISION XIID. |
| DECISION XIID: | Is word count B=0?<br>YES--STEP IA  NO--DECISION XIIE |
|  | (Visibility Test) |
| STEP XIIE: | (1) Same as STEP XIID items 1 and 2. |
|  | (2) Wait for DAR-T. |
|  | (3) Same as STEP XIID item 7. |
|  | (4) Set first vertex flag. |
|  | (5) Load accumulator 370. |
|  | (6) Increment address counter 320A. |
|  | (7) Decrement word counter 320B. |
|  | (8) DECISION XIIC. |
| DECISION XIIC: | Is word count B=0?<br>YES--STEP IA  NO--STEP XIIF |
| STEP XIIF: | (1) Wait for DAR-T. |
|  | (2) Same as STEP XIIE items 4-7 except set last vertex flag when B=0. |
|  | (3) DECISION XIIC. |
| DECISION XIIE: | Is product of Visibility Test positive or negative?<br>POSITIVE--STEP IA  NEGATIVE--STEP XIIG |
| STEP XIIG: | (1) Same as STEP XIID items 20-23. |
|  | (2) DECISION XIIF |
| DECISION XIIF: | Is word count B=0?<br>YES--STEP IA  NO--STEP XIIG |

XII. COLOR INTENSITY FLAG—CIF (11)

In this instruction the CIF registers are loaded with CIF data from bus 307. Word counter 320B is decremented after each load until B=0.

XIV. STRING INSTRUCTION—STG (12)

In this instruction the initial face of a string of faces is processed from RAM 350 through translation stage 60 into rotation stage 62 as a string of light points or four sided faces. The vertices of the four sided faces are retrieved from RAM 350 in CCW order as described in "XI. RECALL A—RCA (9)."

XV. LOAD H—LDH (13) AND LOAD N—LDN (14)

In this instruction data is loaded into H/N address register 3 from data bus 307, and then into H/N RAM 410 as described in Section VI. H/N Ram 410 receives the data during an idle portion of its cycle.

ROTATION STAGE 62

Figure 8B:
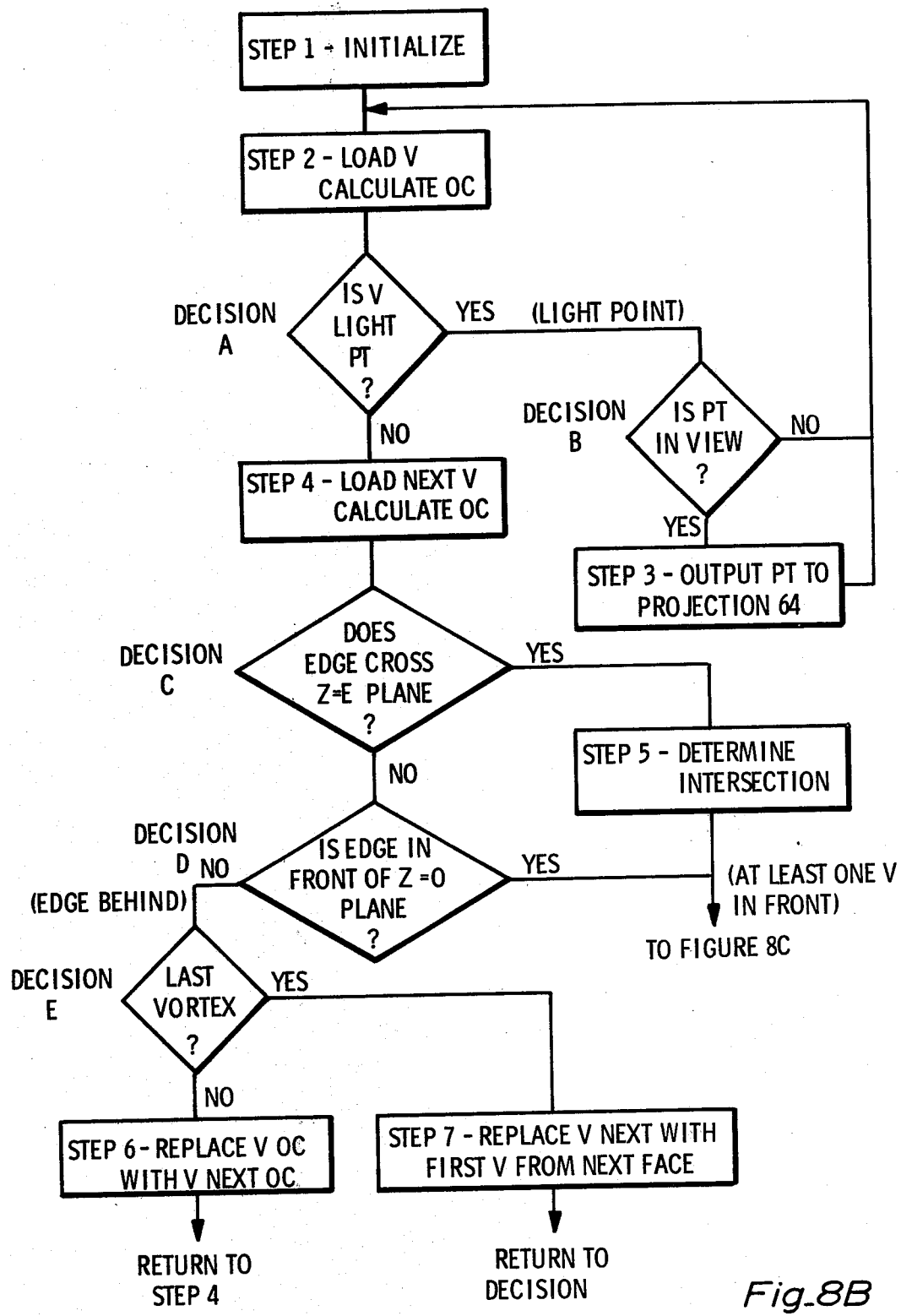

FIG. 8A shows the logic-diagram for the processing of translated point coordinates (Vt) from translation stage 62. Each new Vt is loaded into multiplexers 416X, Y, and Z (Step I). The object code in CIF register 460 which accompanies each new Vt is examined to determine if the new Vt is associated with a 3D face requiring visibility testing (Decision A). If so, the dot product of Vt.Vn (from N RAMs 410X, Y, and Z) is calculated (Step II). The sign bit of the dot product reveals whether the 3D face is visible or not. (Decision B). The vertex of visible 3D faces (Dicision B - yes) and the remaining non-3D face vertices (Decision A - no) are multiplied by the three x three H matrix in H RAMs 410X, Y, and Z to provide the rotated vector Vc - Zc first, Yc second, and Xc last (Step III). Each coordinate is loaded into registers 450X, Y, and Z as they are calculated (Decision C and D, Steps IV, V, and VI).

CLIPPING STAGE 63

Figure 8C:
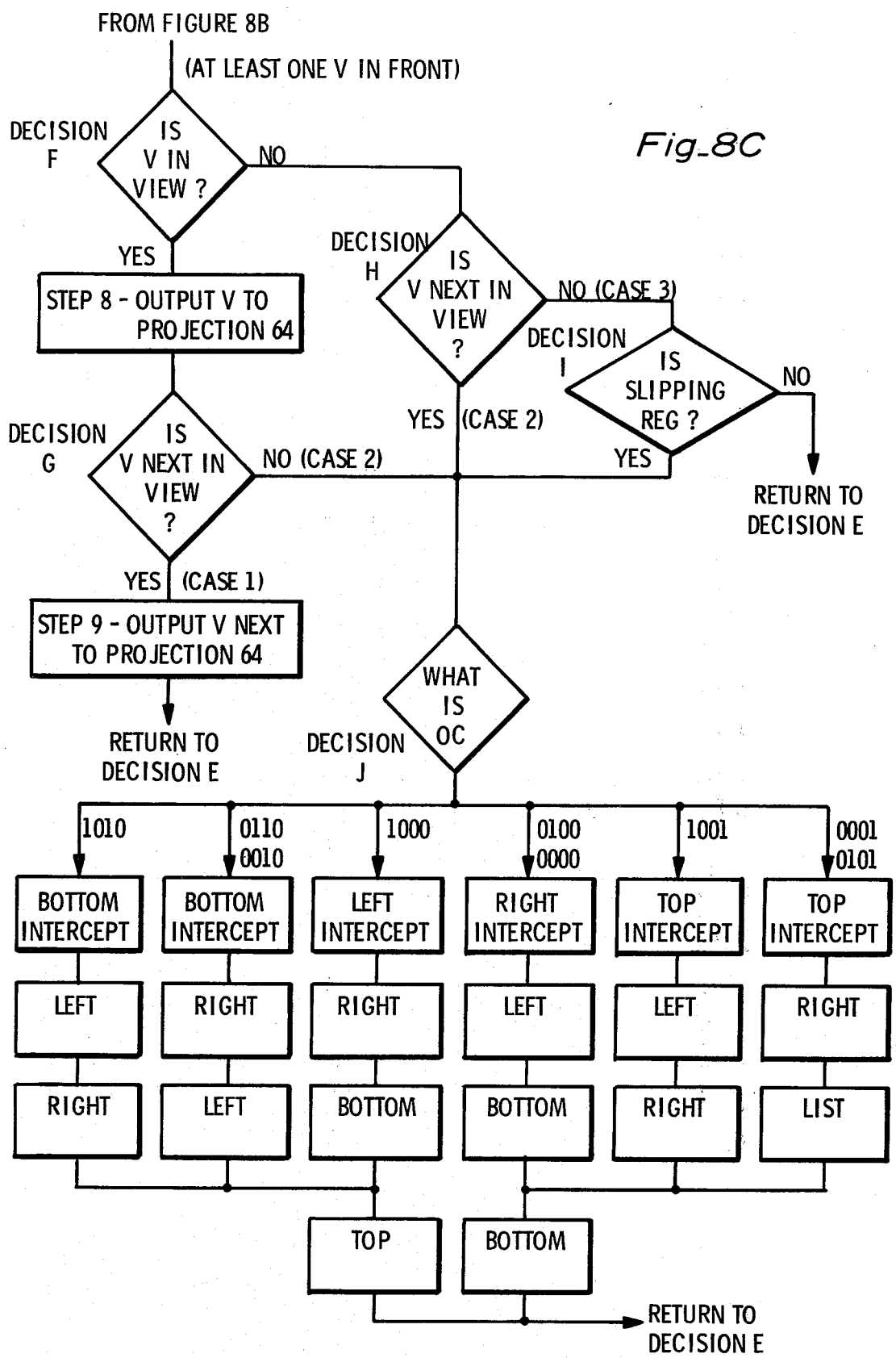

FIGS. 8 B and C show the logic diagram for the control of clipping stage 63. The first point coordinates are loaded into muliplexers 520 (Step 2) and the outcode (OC) for each point is determined by window circuits 510. The object code in CIF register 590 is examined to determine whether the first coordinate is really a polygon vertex (or line end point) or merely a single light point (Decision A). In the case of vertices (and end points), the next vertex (or other end point) is loaded and outcode (OC) determined (Step 4). The OC's are examined to determine if the edge defined by the two vertices crosses the Z=0 plane (Decision C). If the edge crosses the Z=0 plane, then the intersection point is determined by a binary search (Step 5). If the edges do not cross the Z=0 plane, then the OC's of both points are examined to determine if they both are in front of pilot's eye 220 (Z=0 plane) or behind pilot's eye 220 and therefore definitely not visible (Decision D). The endpoints of edges which intersect the Z=0 plane or which are completely in front thereof, are examined via their OC for visibility (Decisions F, G, and H, and Step 8). If both endpoints are out of view (Case 3) the OC's are examined to determine if clipping is required (Decision I). If both endpoints are in view (Case 1) or otherwise do not require clipping, the next vertex coordinates are loaded. If only one vertex is in view (Case 2) or clipping is otherwise required (Case 3), the edge is processed through the appropriate series of binary search routines based on the OC's (Decision J). The binary search routines determine the interception points of the edge with the left, right, bottom or top boundaries of image plane 262. Each interception point becomes a new vertex of a new polygon formed by the visible portion of the original polygon face.

EDGE STAGE 65

Figure 8D:
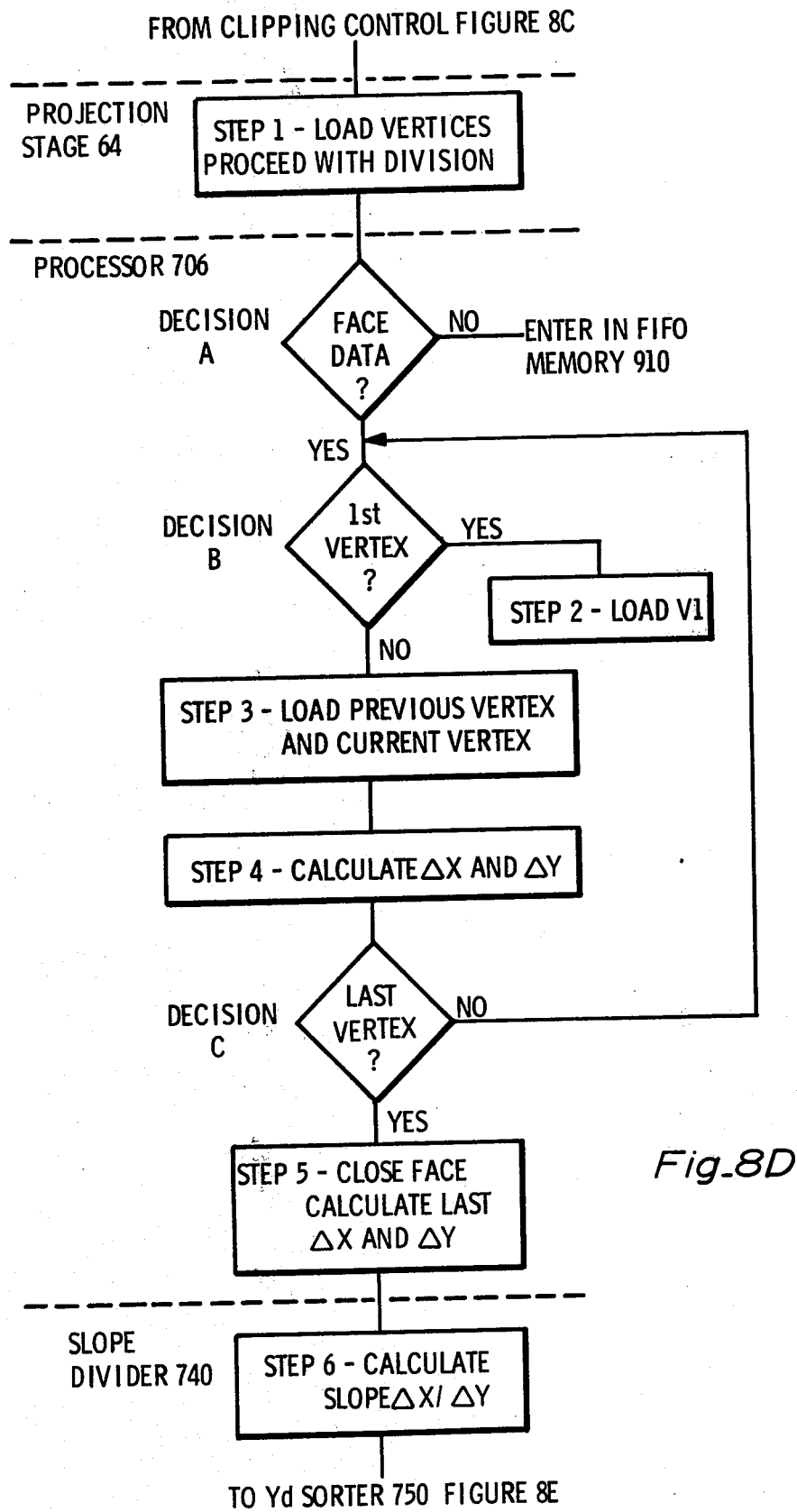

FIG. 8D shows the logic diagram for the control of projection stage 64, processor 706X and Y, and slope divider 740. The clipped points from clipping stage 63 are loaded into registers 610 for projection division (Step 1). The quotients (projected points) are forwarded from registers 640 to edge stage 65, where it is examined for face data (Decision A). Non face data such as points and line segments are forwarded immediately to FIFO memory 910. Each face data point is examined for a first vertex (Decision B), which are loaded in V1 register 718 and current Yd multiplier register 710 (Step 2). Each non first vertex is loaded into register 710 as the current Yd and the previous Yd is advanced to register 716 (Step 3). Xd is similarly processed through processor 706X. Delta X and delta Y are calculated from their current and previous values, and loaded into registers 724 (Step 4). When the last vertex becomes the previous vertex in register 716 (Decision C), the face is closed by advancing V1 from register 718 to register 710 as the current vertex (Step 5). The last slope is calculated from the previous vertex (Vlast) and the current vertex (V1) and entered into register 724. The slopes are calculated by slope divider 740 as the delta X's and delta Y's are provided (Step 6).

TEXTURE STAGE 72

FIG. 8E shows the logic diagram for the control of Yds sorter 750. Input face edges are loaded into sorter 750 and examined for horizontal edges—delta Y=0 (Decision D). Horizontal edges are forwarded to FIFO memory 910 (Step 7). The non horizontal edges are examined for a first edge (Decision E). The first edge is entered at the start of the sort list (Step 8). Non first edges are examined to determine whether the input Yds is less than the last or output Yds in sorter 750 (Decision F). Smaller input Yds are entered at the start of the sort list (Step 9). Larger Yds are examined for a last edge (Decision G). Last edge is entered in last place of sort list (Step 10). The second edge is loaded (Step 11) and examined for input Yds less than the last Yds in sorter 750 (Decision H). Smaller Yds are inserted in the sort list (Step 12). Larger Yds are examined for last edge (Decision I). Last edges are entered into the sort list (Step 13). If the input edge is not the last edge, the next edge is loaded (Step 14). The input edge is again examined for a last edge (Decision J)—return to Decision D of flow chart for non last edge, and output sorter 750 to FIFO memory 910 for last edge.

SECTION XIV

DISPLAY GENERATOR 44

MINIRASTER STAGE 72

Miniraster Stage 72, shown in FIG. 9, provides miniraster data for the set of horizontal scan lines forming each face. The width of the miniscan lines progressively increase and/or decrease in response to the face edge list (Xds, Yds, raster delta X, and Ydt for each edge) from face generation stage 65. The miniraster data for each miniscan line includes the Xd coordinate of the left hand end point (XdL), the width of the miniscan line (W), the Yd coordinate (Yd scan), Zc and CIF.

The edge list is loaded into FIFO memory 910 in CW order once each frame, and is sequentually extracted in CCW order twice each frame—once for the field of even miniscan lines, and once for the field of odd miniscan lines. X coordinate generators 920L and 920R provide XdL and XdR respectively for each miniscan line by combining Xds with the raster delta X of the two opposed edges of the face which contain the end points of the scan line. Xds is incremented by the left hand slope (raster delta XL) to form each XdL, and Xds is incremented by the right hand slope (raster delta XR) to form each XdR. Generator 920L is shown in detail. Raster delta XL multiplexer 928 divides raster delta XL by two (select START) for the first scan line of the even field, to accomodate the one half scan height displacement between the interlaced odd and even fields on display 82. During the remainder of the display cycle, raster delta XL is passed through multiplexer 928 without division (select ACC) to accomodate the proper height spacing between adjacent miniscan lines in the same field. Adder 930 combines the X coordinate of the previous scan line (XdLp) with the current XL slope to provide the current X coordinate (XdLc). Output multiplexer register 940 provides either XdLs (select START) or XdLc (select ACC) to miniraster data register 950. Subtractor 952 provides the width W of each scan line by subtracting XdLc from XdRc (output of generator 920R). The Y coordinate of the miniscan lines (Yd scan) is similarly formed by incrementing Yds with raster delta Y from variable delta generator 78Y. At the end of each edge, Yd scan equals or exceeds the Ydt on the left edge (YdLt) or right edge (YdRt). The signals Yd scan≧YdLt and Yd scan≧YdRt indicate to control logic 70 that the next XL slope or XR slope is required in Xd generators 920.

DETAILED DESCRIPTION

FIFO memory 910 may be a 2048 words×100 bit memory (two hundred 82S11's) for sequentially outputting the complete edge list twice each cycle. Memory 210 interfaces with the remainder of miniraster calculator 72 through a 100 bit register (twenty five 74S175's).

Delta XL register 924 may be a 20 bit storage register (five 74S175's) for holding each new delta XL as they are provided by memory 910.

Delta XL multiplexer 928 may be a 20 bit 2:1 multiplexer (five 74S157's) with the START input right shifted to provide a division by two. The START and ACC select are provided by control logic 70.

XL Adder 930 may be a 20 bit adder (five 74283's) for incrementing each previous X left coordinate (XdLp) by the current raster delta XL.

Limit multiplexer 934 may be a 20 bit 4:1 multiplexer (ten 74S153's) for preventing underflow and overflow when an edge approaches the display boundary. The four inputs are XdLc (twice), all zeros (overflow), and all ones (underflow). The two select inputs are the sign bits of XdLc and XL slope. Overflow occurs when both sign XdLc and sign delta XL are negative. Underflow occurs when sign XdLc is negative and sign delta XL is positive.

XdLs register 938 may be a 12 bit register (three 74S175's) for holding the X coordinate of the starting end point of the current edge (Xds) as it is provided by FIFO memory 910.

Output multiplexer register 940 may be a 20 bit 2:1 multiplexer register (five 25S09's) for accumulating XdLc and outputting either XdLs or XdLc. The output is returned to adder 930 and forwarded to miniraster data register 950.

Miniraster data register 950 may be a 76 bit register (nineteen 74S175's) for holding the miniraster data (XdLc 12 bits, W 12 bits, Yd scan 16 bits, and CIF 24 bits).

Subtractor 952 may be a 12 bit subtractor (three 74283's and two 74S04's) for providing the width of each miniscan line (W=XdRc−XdLc) to register 950.

Variable delta generator 78Y may be a look up table.

Delta Y multiplexer 964 may be a 12 bit multiplexer (two 74S157's) similar in function to delta XL multiplexer 928.

Y Adder 968 may be a 12 bit adder (three 74283's) for combining the 12 bits of Yslope with the 12 bits of Y coordinate of the previous scan line (Ydp) to form the Y coordinate of the current scan line (Yd scan).

Multiplexer register 970 may be a 12 bit multiplexer register (three 25S09's) similar in function to output multiplexer register 940.

Ydt register 974 may be a pair of 12 bit registers (six 74S175's) for holding the Yd coordinates of the left hand edge termination point (YdLt) and the right hand edge termination point (YdRt) which are periodically forwarded by FIFO memory 910.

Comparator 978 may be a pair of 12 bit comparators (six 74S85's) for comparing Yd scan with YdLt and YdRt to determine the end of each edge.

DEFLECTION CONTROL 74

Deflection stage 74 receives Yd scan accompanied by a series of XdLc's and W's for generating the sweep voltages which provide the series of horizontal scan lines outlining each polygon face. Yd scan identifies vertical position of the first vertex. XdL identifies the left hand start of each scan line thereafter. W determines the length of each scan line. Conventional integrator techniques may be employed to provide the appropriate X and Y ramp deflection voltages. The Y ramp changes at a uniform rate starting at Yd scan to move the CRT beam vertically across the face being displayed. The X ramps change at a much faster rate starting from an XdL to move the beam horizontally a distance indicated by the associated W. Suitable deflection techniques are disclosed in detail in U.S. Pat. No. 3,999,308 entitled "Real-Time Simulation of a Point System Having Textured Areas as Viewed by a Moving Observer" issued on Dec. 28, 1976 to Robert Louis Peters.

VIDEO CONTROL 76

Video control 76 receives color and intensity data from CIF 660 in projection stage 64 for each face being displayed to control the color and display brightness of the scan lines forming that face. If desired, the display intensity may be attenuated by Zc data for range simulation. Suitable video control techniques are also disclosed in detail in U.S. Pat. No. 3,999,308.

FULL RASTER EMBODIMENT

If desired, the edge list from register 760 may be displayed on a full raster in the conventional frame manner across the entire screen of display device 82. The vertices of all visible polygon faces (or visible portions thereof) for each frame are sorted by Yds to arrange the vertices in display order by raster. Next, the contents of each scan line are sorted by Xds to arrange the vertices in order of display within each scan line. The resulting Yds-Xds sorted edge list with accompanying slope and Ydt data is processed through a conventional full raster display generator which provides the necessary vertical and horizontal sweep voltage waveforms.

SECTION XV

VARIABLE DELTA GENERATOR 78

A. RESOLUTION CODE EMBODIMENT

Figure 10:
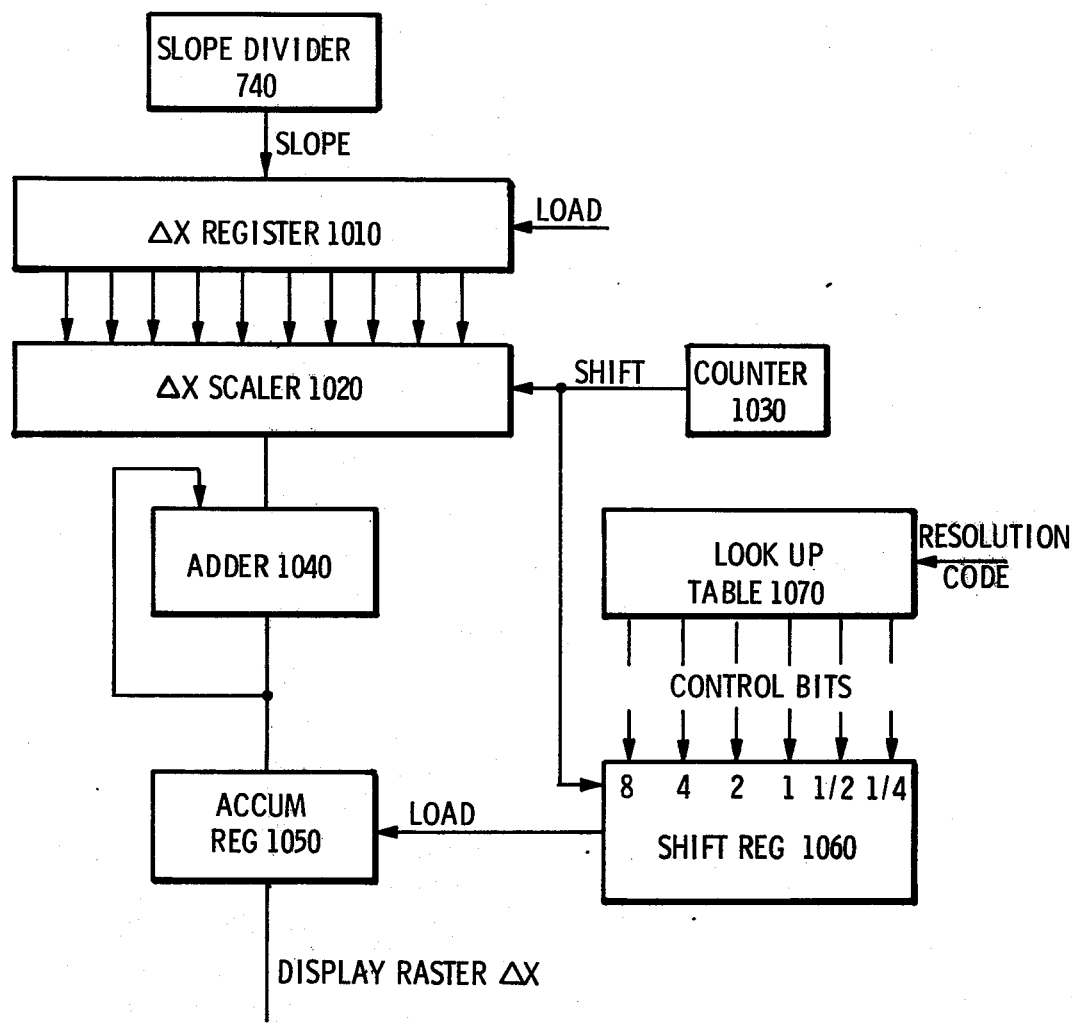
FIG. 10 is a circuit diagram of a variable delta generator 1000.

FIG. 10 shows a detailed schematic of one embodiment of variable delta X generator 78X which is responsive to resolution data in the form of a three bit resolution code for multiplying the slope of each edge by a resolution factor. The resolution factors consist of a series of eight preselected numbers between 8 and $\frac{1}{4}$ which increase the raster delta X at lower resolutions.

Slope register 1010 receives each edge slope from slope divider 740 in response to LOAD from logic 70. The magnitude of the slope is equal to the change in X corresponding to the change in Y at the highest resolution, which in the embodiment shown is 1024 lines per frame (512 lines in each of the two interlaced fields). The binary point of each edge slope is hardwire shifted three places to the left on loading into slope register 1010, and becomes eight times as large—a delta X corresponding to the lowest resolution of the embodiment shown, 128 lines per frame. The large delta X is then passed through scaler 1020 where the binary point is sequentially right shifted five times by counter 1030 forming in sequence 8 delta X, 4 delta X, 2 delta X, 1 delta X, $\frac{1}{2}$ delta X, and $\frac{1}{4}$ delta X. Particular elements of this power of two series are combined to form each of the resolution factors. Each element of the series enters adder 1040 as scaler 1020 is right shifted. The required ones of these elements are combined one at a time in accumulator 1050 in response to the sequence of control bits in shift register 1060 as shown in the following table:

| Resolution Code | Resolution Factor | Elements Combined | Control Bits | New Resolution |
|---|---|---|---|---|
| 111 | 1 | 1 | 000 100 | 1024 |
| 110 | 1¼ | 1+¼ | 000 101 | 896 |
| 101 | 1½ | 1+½ | 000 110 | 768 |
| 100 | 1¾ | 1+½+¼ | 000 111 | 640 |
| 011 | 2 | 2 | 001 000 | 512 |
| 010 | 3 | 2+1 | 001 100 | 384 |
| 001 | 4 | 4 | 010 000 | 256 |
| 000 | 8 | 8 | 100 000 | 128 |

The elements of the power of two series are loaded (or not loaded) into accumulator register 1050 as required, by the sequence of control bits clocked out of shift register 1060 by counter 1030 in synchronization with the shifting of scaler 1020. The proper control bits for each resolution factor are provided to shift register 1060 by look up table 1070 in response to the resolution code.

Variable delta Y generator 78Y for the resolution code embodiment provides one of eight possible scan line spacings in response to the three bit resolution code.

B. RESOLUTION MODIFICATION EMBODIMENT

Figure 11:
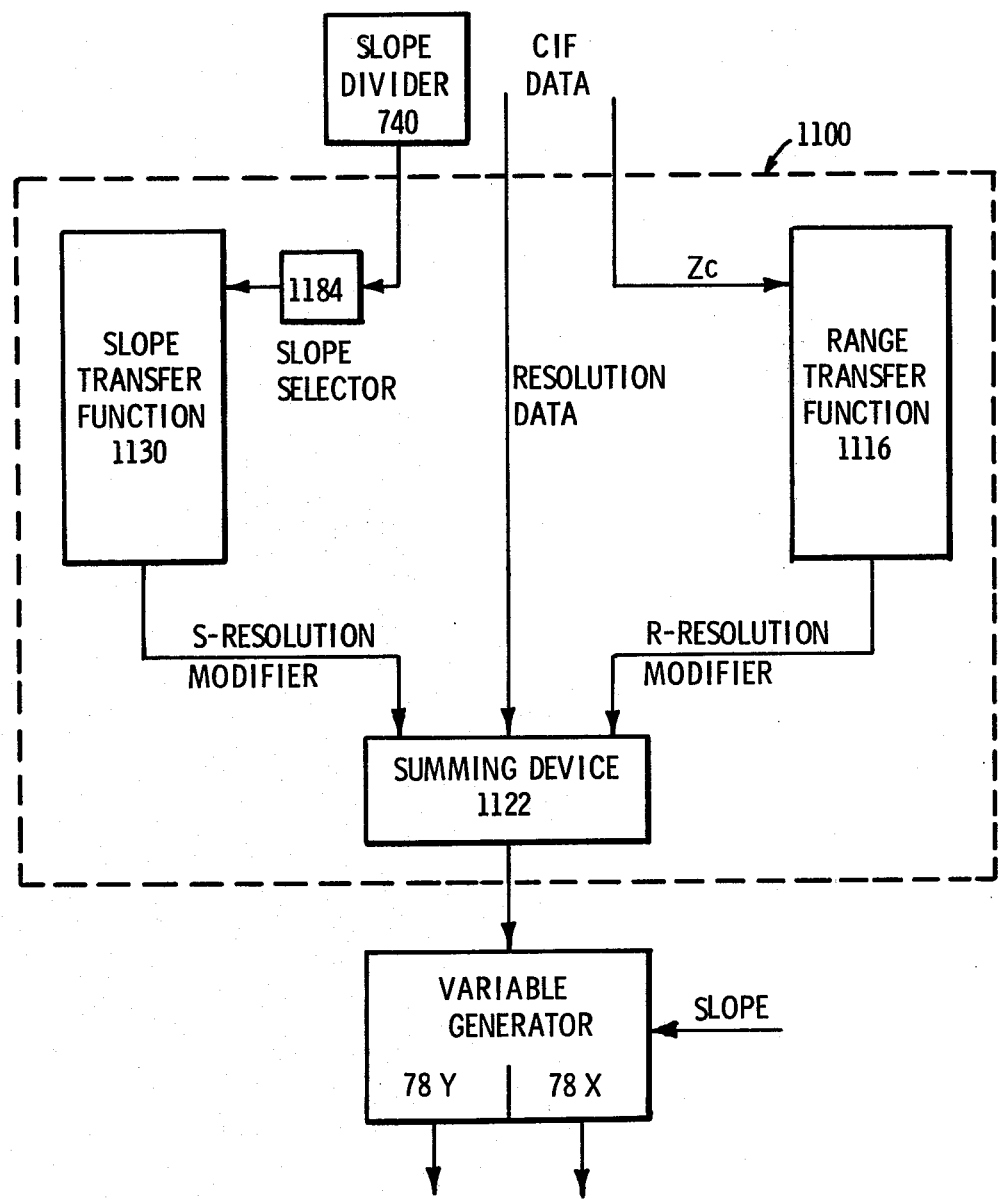
FIG. 11 is a block diagram of a resolution modification circuit 1100.

FIG. 11 shows a resolution modifying circuit 1100 responsive to range Zc and edge slope for adjusting the resolution code of any given face between frames for providing the actual display resolution of that face. Circuit 1100 provides the optimum display resolution for maximizing data processing while maintaining the picture quality standards. Objects at a great distance from the pilot's eye 220 may be adequately displayed at low resolutions. The minimum acceptable resolution requirement increases as the range of the object diminishes. Range Zc is applied to range transfer function 1116 which provides an R—resolution modifier to summing device 1122. The resolution code from CIF data is increased or decreased as a function of the R—resolution modifier prior to being received by variable delta generator 78X and 78Y. Each face in terrain data base 48 has an assigned resolution which is altered by the R—resolution modifier from transfer function 1116 as the range of each face varies. Important faces which have a high assigned resolution are displayed at lower resolutions when far away. The display resolution increases as the face approaches the viewer. Less important faces which have a low assigned resolution are displayed at an even lower resolution when Zc in high. Each face is displayed with the least number of scan lines without detracting from the visual quality of the scene. CRT scanning time is not wasted by displaying a face at a resolution higher than the detection level of the viewer.

FIG. 11 also shows a slope transfer function 1130 for modifying the display resolution of each face as a function of the edge slopes of the current face. As any edge of a face approaches a horizontal orientation (parallel with the scan lines) the raster saw teeth therein become more pronounced. The saw teeth may be "smoothed" or reduced in amplitude by increasing the resolution of faces with near horizontal edge slopes. Slope transfer function 1130 provides an S-resolution modifier to summing device 1122 for increasing or decreasing the resolution code for "smoothing" saw teeth along near horizontal edges. Slope selector 1134 forwards the most horizontal slope of each face to slope transfer function 1130.

The modification of face resolution on a face by face basis through transfer functions in response to changing scene content and perspective, has application beyond the slope and range situation described above. Face resolution may be modified in response to scene complexity based on the limited time available to display a single frame (which in the embodiment shown is 1/30th of a second-1/60th of a second per field). Face resolution may also be employed to control the display intensity of each face. The attenuation of intensity over distance may be simulated by an increase in scan line density as range decreases—a measure which conveniently corresponds to the higher resolution requirement at close ranges. Shading and other texture effects may be provided by modifying resolution on a scan line by scan line basis.

C. DIRECT RESOLUTION DATA EMBODIMENT

Data base 48 may provide the actual vertical resolution in lines per frame directly without employing the resolution code of FIG. 10. This direct resolution data embodiment requires a larger data word (9 bits for a 512 line field plus an additional bit to indicate odd or even field) then the resolution code embodiment (3 bits defining eight predetermined resolutions). The resolution modification circuit of FIG. 11 may employ the larger direct resolution data, and increase or decrease the assigned resolution in view of the range and slope situation.

DETAILED DESCRIPTION

Delta X Register 1010 may be a twenty four bit register (six 74S175's) for holding each slope as it is generated by slope divider 740.

Delta X Scaler 1020 may be a position scaler (twelve 25S10's, cascaded in two levels) for providing five right shifts.

Counter 1030 may be a four bit counter (74161).

Adder 1040 may be a 24 bit adder (six 74283's) for combining the successive elements of the power of two series from scaler 1020 with the previously accumulated elements in accumulator 1050 to form each resolution factor.

Shift register 1060 may be a six bit shift register for providing the proper six bit sequence of control bits for loading accumulator 1050.

Look up table 1070 may be a 32 word×8 bit PROM (one 6331—Monolithic Memories).

Range transfer function 1116 may be a look up table (a series of 6306's) which provides an R-resolution modifier for every value of Zc for generating the desired range to resolution relationship.

Summing device 1122 may be an adder (two stages of 74283 with a limiting circuit to prevent overflow and underflow) for combining the effects of the range modifier and the slope modifier on the resolution data.

Slope transfer function 1130 may be a look up table similar to range transfer function 1116 except that the change in resolution points are selected to optimize the edge smoothing-time trade off.

Slope selector 1134 may be formed by the following elements:

A. A series of exclusive OR gates, one gate for receiving each bit of the current input slope except the sign bit. The other input to each gate receives the sign bit of the current input slope for inverting all of the exclusive OR gates whenever the sign bit is negative.

B. As adder having a CIN responsive to the sign bit for increasing the current input slope by one when the sign bit thereof is negative.

C. A register for receiving the 2's complement output of the adder corresponding to the most horizontal slope—which in the embodiment shown in FIGS. 1-9 is the slope with the largest absolute value.

D. A comparer for receiving both the current input slope from the adder and the slope in the register, and loading the greater of the two back into the register.

After all of the slopes for a particular face have been compared, the most horizontal slope thereof is in the register and is forwarded to slope transfer function 1130.

SECTION XVI

CONCLUSION

The present invention provides the variable resolution feature in the polygon face visual system described. Each face is displayed by its own miniraster defined by the face vertices independently of the other faces. A common scan line density or resolution is not required. Each face has its own resolution as provided in the object data source. The low resolution faces can be displayed in fewer scan lines requiring less time than high resolution faces of the same size. In the prior art full raster display, the common resolution dictated the display time required for each scene and defined a scene complexity limit. The present invention is not limited to a fixed resolution and display processing rate. More complex scenes can be displayed in the same frame time.

In the resolution code embodiment, a small data word (3 bits) in the object data base defines a limited number of resolutions (8) from which each face resolution may be selected. In the direct resolution data embodiment, the resolution is obtained directly from the data source without an intervening code. A larger data word is required for each face to define the resolution.

In either embodiment, the resolution data may be modified to provide a modified display resolution for optimumly balancing the scene complexity with the face resolutions. Lower resolutions may be employed for distant faces and faces without near horizontal edges without detracting from picture quality. These faces can be processed rapidly. Higher resolutions are required as each face moves closer to the viewer and as an edge of any face orients toward the horizontal. These faces require more time to be displayed.

We claim as our invention:

1. An image data system responsive to observer data and responsive to a three dimensional object system of a polygon face object within an object coordinate system adapted to be displayed on a raster type display device which employs a separate miniraster and scan line density for each face, for providing the display of a perspective view of the object system as viewed by an observer, comprising:
   an object system data means for providing object position data defining the position within the object coordinate system of each of the vertices of the polygon faces, and for providing object resolution data defining the scan line density for the miniraster displaying each face;
   image processor means for receiving the observer data and the object data, and processing the polygon face vertices for providing a first display coordinate and a second display coordinate for each vertex which establish the perspective relationships among the vertices as viewed by the observer;
   slope determining means responsive to the display coordinates for each pair of adjacent vertices within each polygon face, for providing the slope of the face edge extending between each pair of adjacent vertices, wherein the slope is the change in the second coordinate for each pair of vertices divided by the change in the first coordinate of each pair of vertices;
   first increment generator responsive to the resolution data for providing an increment change along the first display dimension to establish the spacing between adjacent scan lines corresponding to the scan line density defined by the resolution data;
   a second increment generator responsive to the resolution data and to the slope of the face edges for providing the incremental change along the second display dimension;
   miniraster generation means responsive to the display coordinates of the vertices of each face and to the increment generators for providing the display coordinates of each end point of each scan line within the miniraster displaying each face; and
   display generator means responsive to the display coordinates of the scan line end points for providing the deflection signals required by the display device to display a two dimensional perspective view of the three dimensional object system.

2. The system of claim 1, wherein the resolution data is a binary code corresponding to a set of preferred scan line densities.

3. The system of claim 2, further comprising decoder means responsive to the resolution code for providing the particular scan line density corresponding to each resolution code.

4. The system of claim 3, wherein the value of the scan line density provided by the decoder means is in the form of the spacing increment along the first display dimension which defines the spacing between adjacent scan lines.

5. The system of claim 4, wherein the decoder means is formed by a first decoder in the first increment generator and a second decoder in the second increment generator.

6. The system of claim 5, wherein the first decoder is a look up table means for providing a set of scan line spacings, one spacing in response to each resolution code.

7. The system of claim 6, wherein the ratio of each scan line spacing of the set to the smallest scan line spacing of the set form a series of ratios some of which are non integers.

8. The system of claim 7, wherein each ratio of the series of ratios is formed by combining selected powers of two of unity with the smallest ratio.

9. The system of claim 8, wherein the second decoder comprises:
   shiftable means for forming a power of two series from each slope;
   adder-accumulator means which provides the second increment by forming the sum of selected powers of two;
   shift control means for coordinating shift of the shiftable means with the adder-accumulator means to combine the selected powers of two; and
   look up table means responsive to the resolution code for selecting the powers of two which are summed to provide the second increment.

10. The system of claim 1, further comprising a resolution modification means for receiving the resolution data, and modifying the resolution data in response to a portion of the image data for establishing the display resolution of each face.

11. The system of claim 10, wherein the resolution modification means is responsive to the range portion of the image data which defines the distance between the observer and each face of the object system.

12. The system of claim 11, wherein the display resolution increases as the range decreases.

13. The system of claim 10, wherein the resolution modification means is responsive to at least one of the edge slopes of each face.

14. The system of claim 13, wherein the resolution modification means is responsive to the slope of that edge which has an orientation most closely approaching the scan line direction.

15. The system of claim 14, wherein the display resolution increases as the orientation of that edge more closely approaches the scan line direction.

16. The system of claim 10, wherein the resolution modification means comprises:
   transfer function means incorporating a predetermined relationship between the resolution data and a portion of the image data for providing a modifier value; and
   combining means which receives the modifier value from the transfer function means and the resolution data for providing the display resolution.

* * * * *